United States Patent [19]

Morita et al.

[11] 4,033,206

[45] July 5, 1977

[54] NUMERICALLY CONTROLLED MACHINE TOOL

[75] Inventors: Eiichi Morita; Akira Toda; Toru Kobayashi; Hiroshi Fujii, all of Ikeda, Japan

[73] Assignee: Daihatsu Motor Co., Ltd., Osaka, Japan

[22] Filed: July 8, 1975

[21] Appl. No.: 593,969

[30] Foreign Application Priority Data

| Oct. 19, 1974 | Japan | 49-120670 |
| Feb. 13, 1975 | Japan | 50-18598 |
| Apr. 3, 1975 | Japan | 50-40879 |
| Apr. 4, 1975 | Japan | 50-41410 |
| May 1, 1975 | Japan | 50-53624 |
| June 9, 1975 | Japan | 50-69929 |
| July 11, 1974 | Japan | 49-79817 |

[52] U.S. Cl. .............................................. 82/2 B
[51] Int. Cl.² ........................................ B23B 3/00
[58] Field of Search ................................ 82/2 B

[56] References Cited

UNITED STATES PATENTS

| 2,838,963 | 6/1958 | Good et al. | 82/2 B |
| 2,875,390 | 2/1959 | Tripp | 82/2 B |
| 2,892,526 | 6/1959 | Devaud | 82/2 B |
| 3,324,364 | 6/1967 | Caruthers | 82/2 B |
| 3,641,849 | 2/1972 | Kinney | 82/2 B |
| 3,704,641 | 12/1972 | Rhoades | 82/2 B |
| 3,727,493 | 4/1973 | Lahm | 82/2 B |
| 3,811,345 | 5/1974 | Kobayashi et al. | 82/2 B |
| 3,854,353 | 12/1974 | Cutler | 82/2 B |

*Primary Examiner*—Harrison L. Hinson
*Attorney, Agent, or Firm*—Hall & Houghton

[57] ABSTRACT

A numerically controlled machine tool characterized in that the working modes of cutting tools are classified according to fixed cycles and control information is put into the machine through digital switches.

5 Claims, 69 Drawing Figures

Fig 4
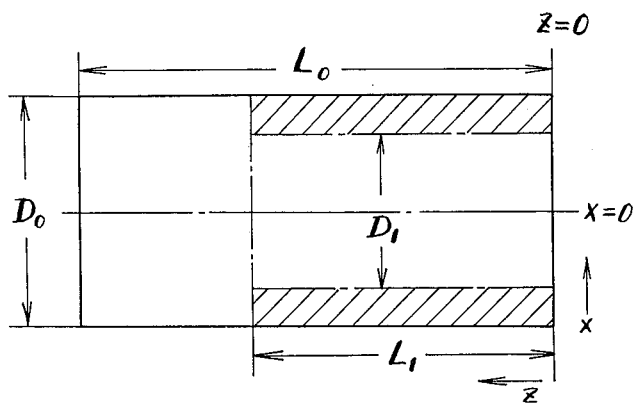
Fig 5
| woking mode | Machining dimension in the X direction | Machining dimension in the Z direction | Outer diameter |
|---|---|---|---|
| 1 | 100.00 | 120.00 | 150 |
Fig 6
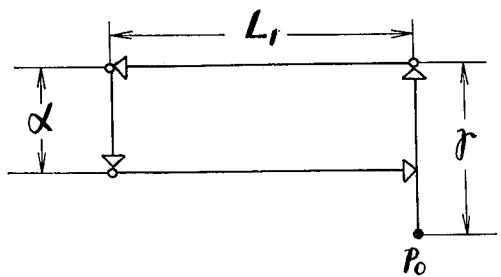

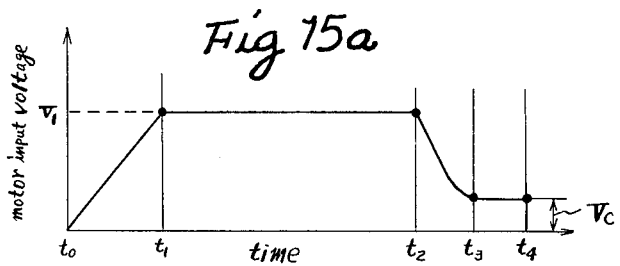
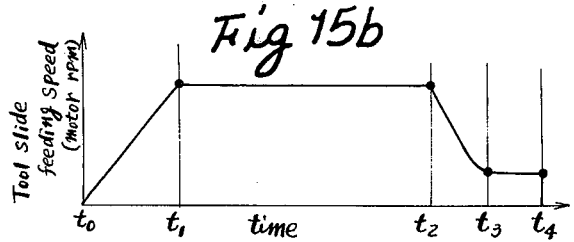
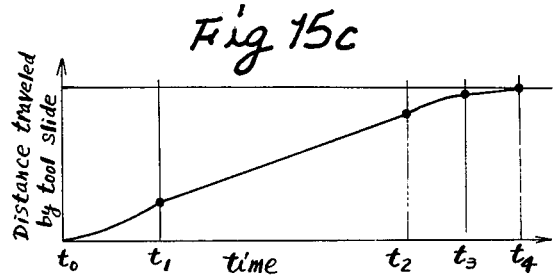
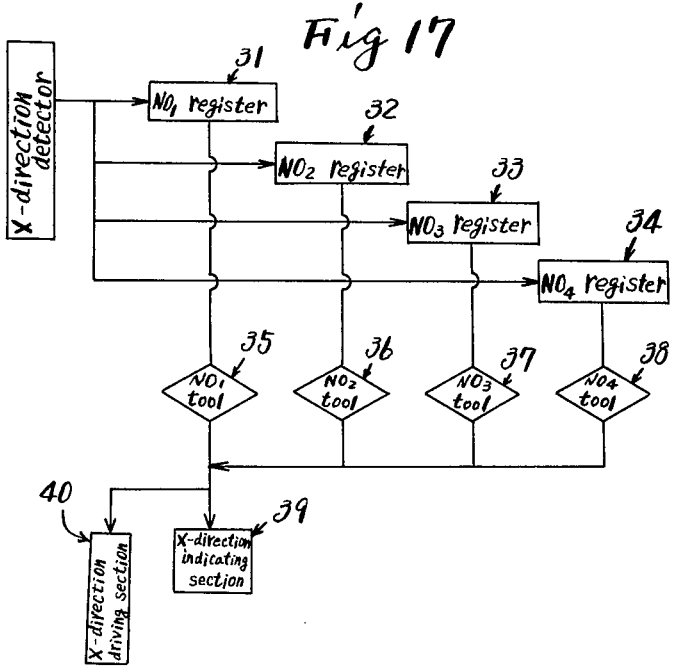
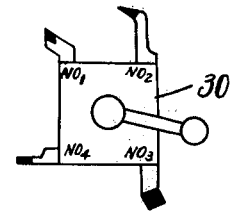
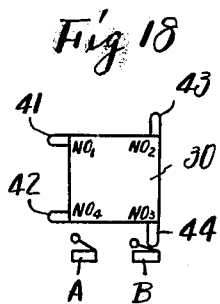

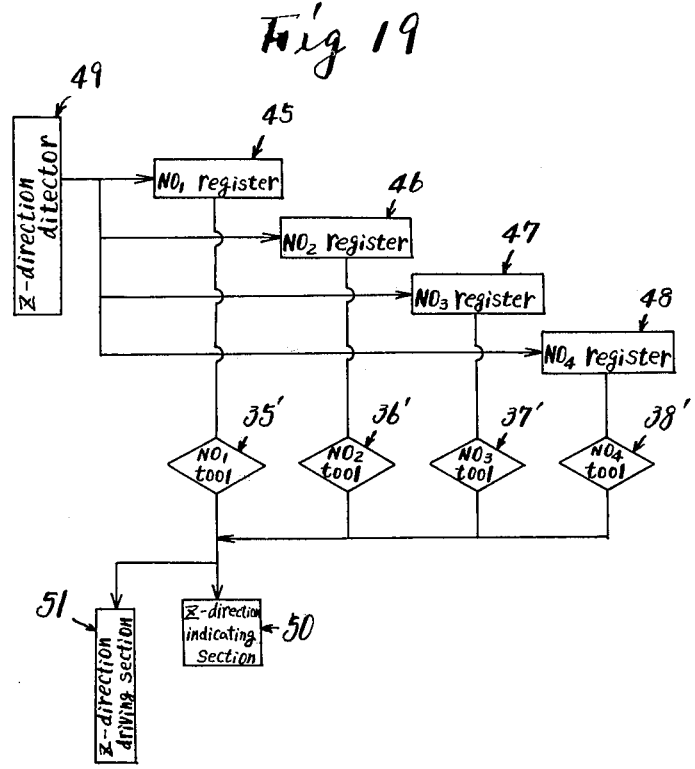

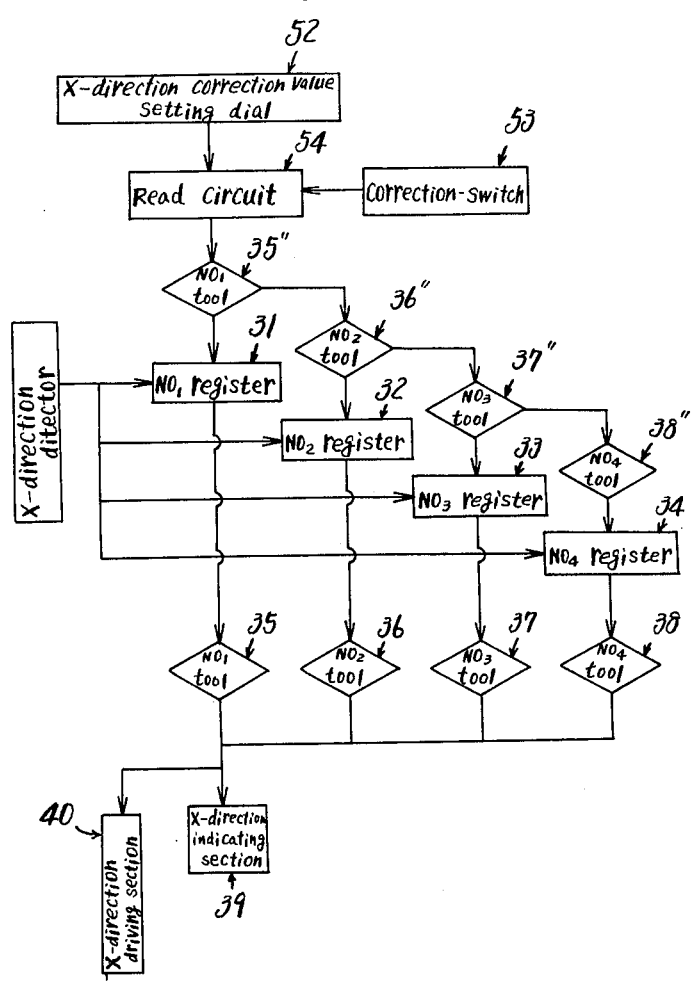

Fig 27
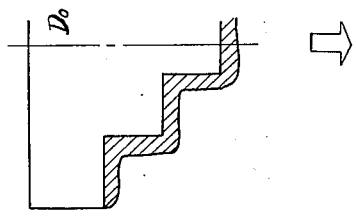
Fig 28
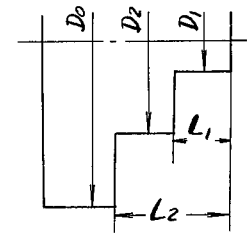
Fig 29
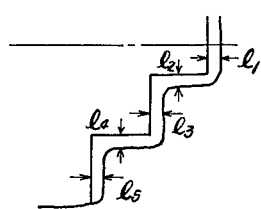
Fig 29a
Machining allowance
$\boxed{\ell}$ : 2 digits (m/m)
Fig 30
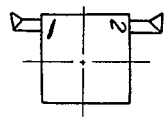
Fig 31
| Shape | Rough | Finish | X | Z | Depth of cut | Finishing allowance | Machining allowance |
|---|---|---|---|---|---|---|---|
| 6 | 1 | 2 | 0 | 0 | $\boxed{\gamma}$ | $\boxed{\delta}$ | $\boxed{\ell}$ |
| 6 | 1 | 2 | $D_1$ | $L_1$ | | | |
| 6 | 1 | 2 | $D_2$ | $L_2$ | | | |

Fig 32
Fig 33
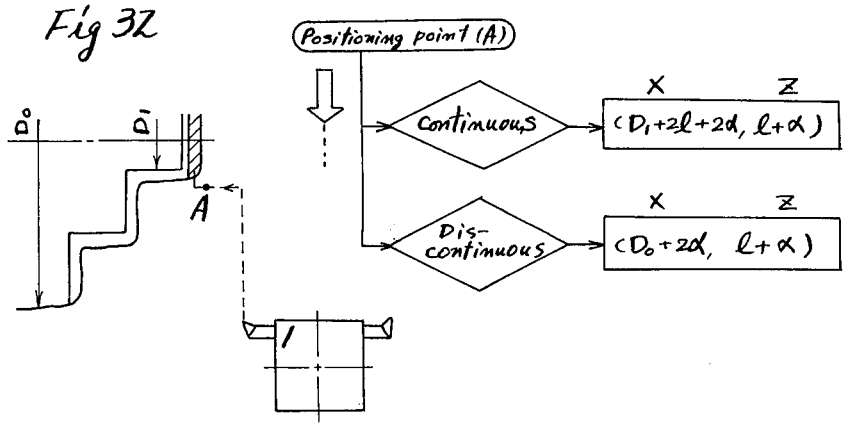
Fig 34
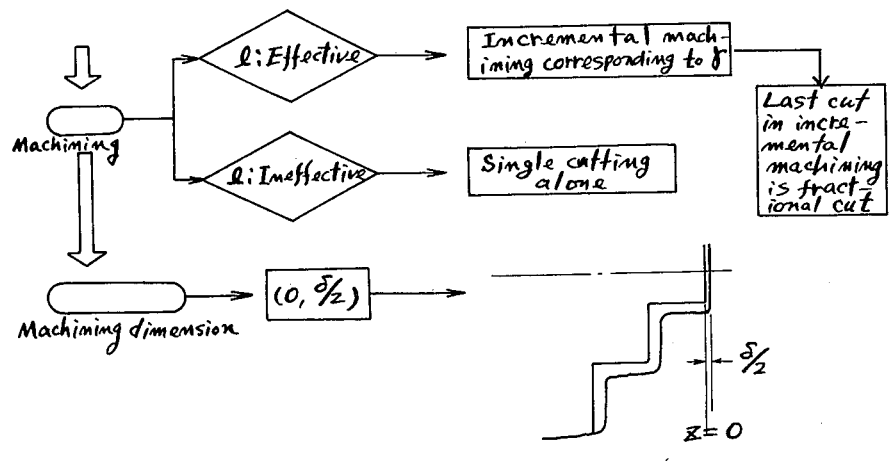
Fig 35
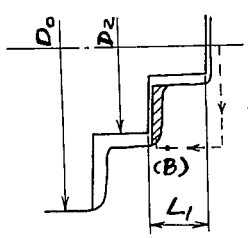
Fig 36
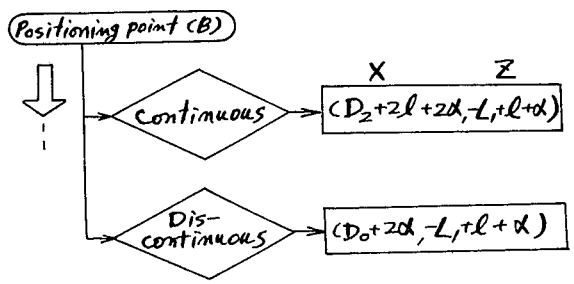

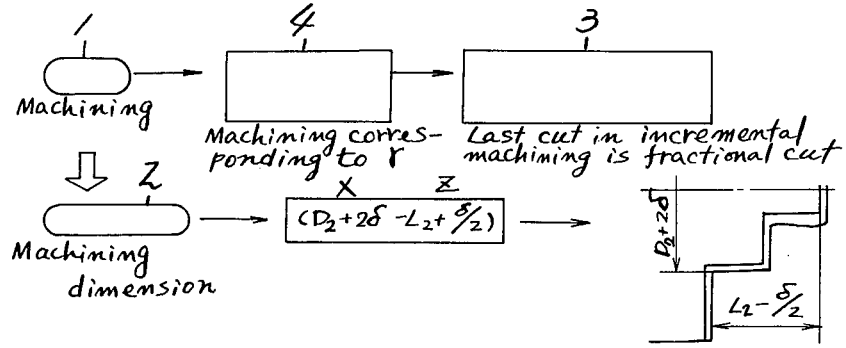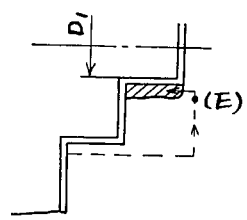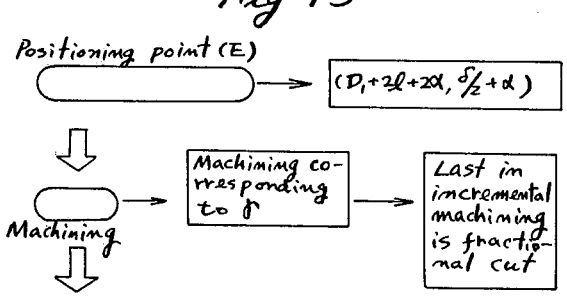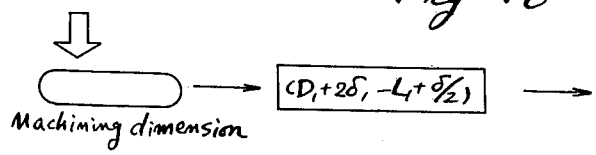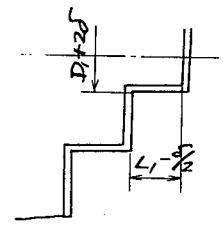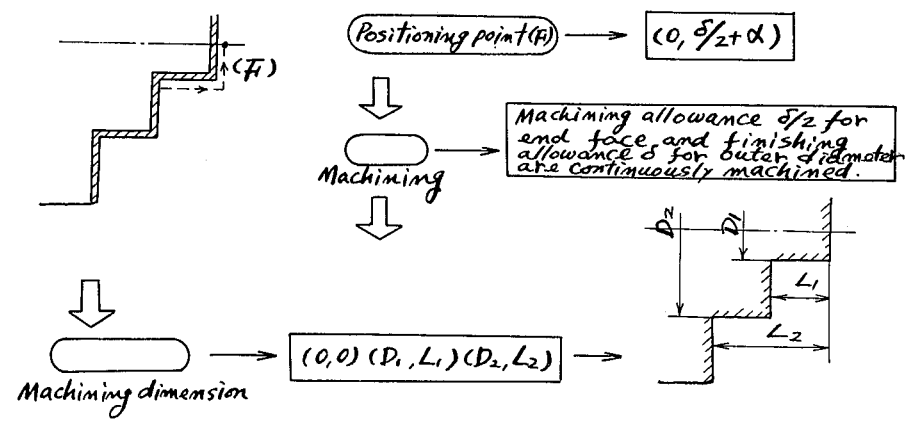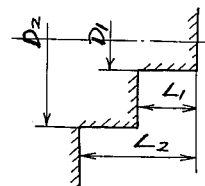

Fig 49
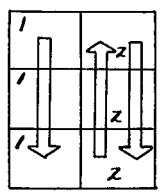
1 ⬇ Rough facing
2 ⬆ Rough external cutting
2 ⬇ Finish facing and external cutting
Fig 50      Fig 51
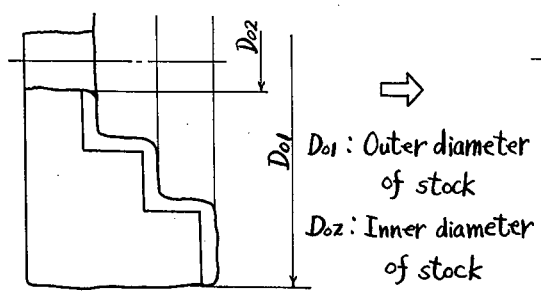
$D_{o1}$: Outer diameter of stock
$D_{o2}$: Inner diameter of stock
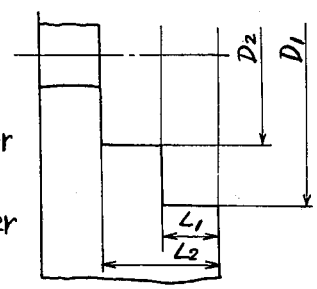
Fig 52      Fig 53
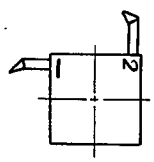
| Shape | Rough | Finish | | X | Z |
|---|---|---|---|---|---|
| 7 | 1 | 2 | -- | $D_{o1}$ | 0 |
| 7 | 1 | 2 | -- | $D_1$ | $L_1$ |
| 7 | 1 | 2 | -- | $D_2$ | $L_2$ |

Note: Numerals refer to tool NOS

Fig 60
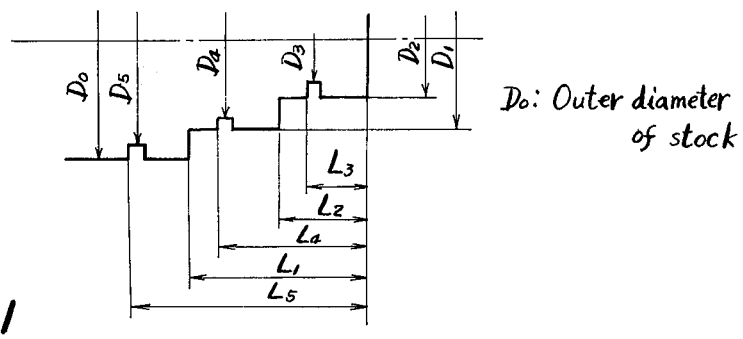
Do: Outer diameter of stock
Fig 61
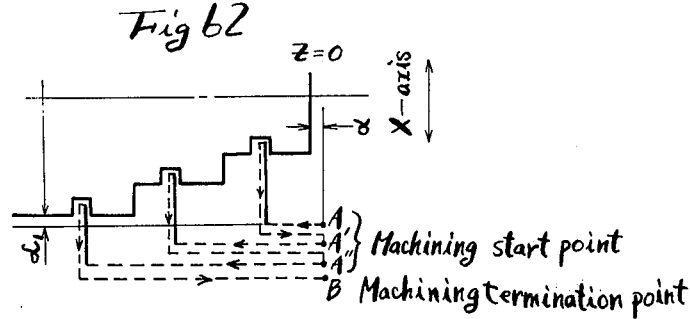
Fig 62
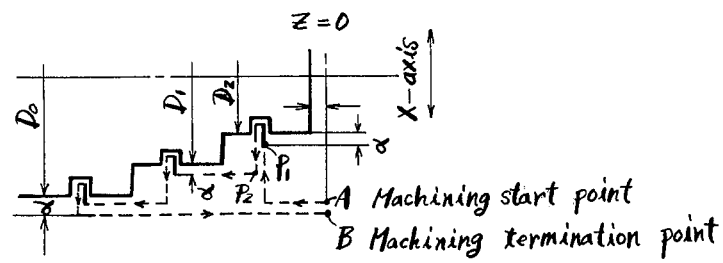
A Machining start point
B Machining termination point
Fig 63
A Machining start point
B Machining termination point

Fig 64

All the control information in the channel or channels which precede the channel to be presently machined which is given by $(D_3, L_3)$ is read.
(see Fig 61)

Does machining shape "1" exist?

yes: The diameter in the machining shape "1" having a length which is greater than and closest to $L_3$ is read. ($D_2$ in Fig 60)

Quick feed to $X = D_2 + 2d \rightarrow$ point $P_1$ no: Cutting feed from the position where $X = D_0 + 2d$

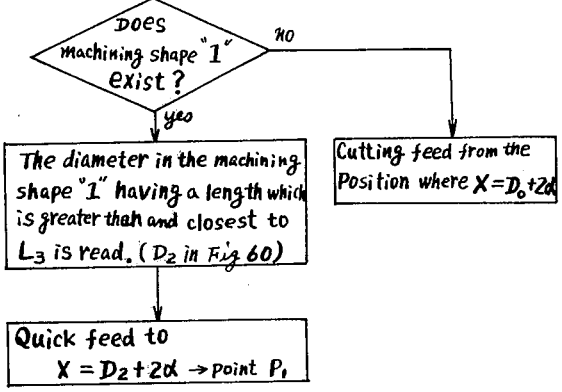

Fig 65

Is the next channel a grooving cycle?

yes: Decision calculation in Figure 66 is done.

no: Quick feed to the position where $X = D_0 + 2d$

Return movement to the machining termination point

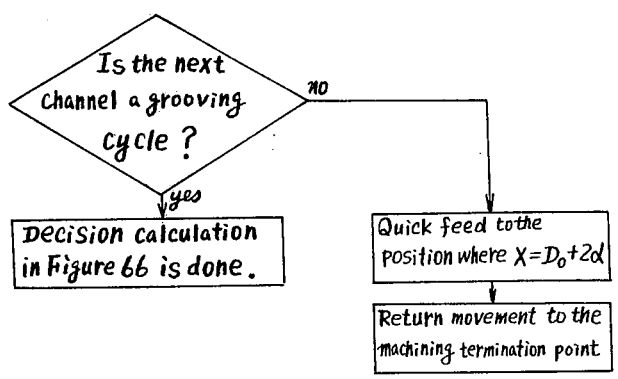

NUMERICALLY CONTROLLED MACHINE TOOL

BACKGROUND OF THE INVENTION a. Field of the Invention

The present invention relates to a numerically controlled machine tool of the type in which a cutting tool is brought against a rotating workpiece to perform lathe work.

b. Description of the Prior Art

Numerically controlled machine tools which are in common use may be classified into two types, one in which all control information is recorded into a punched tape which is then fed into the machine and the other in which the necessary machining operation is actually carried out and such operation is then memorized in the machine.

Both of the types described above have disadvantages that the control unit itself is complicate the expensive and that much time and labor is involved in preparing a punched tape.

Further, difficulties are experienced in connection with cutting tool setting.

SUMMARY OF THE INVENTION

The present invention has for its object to facilitate the operation of putting control information into a numerically controlled machine tool and to greatly reduce the time required for preparatory operation for machining. Further, according to the invention, the working modes of a tool are classified according to several fixed cycles so as to reduce the number of items of control information to be put into a control unit. Moreover, the invention is arranged so that control information to be put into a control unit is put thereinto through digital switches. Also the invention provides for hybridization of general-purpose and automatic machines and for drastic simplification of cutting tool position correction. Further, according to the invention, the driving of the tool slide is effected by a dc motor while the speed control is effected through voltage control, so as to avoid the danger of the tool slide overrunning, thereby improving machining accuracy.

Further, the invention makes the control unit simple and less expensive and improves arithmetic operation performance. Further, the invention provides for great reduction in the machining time required even in the case of machining complicate shapes.

Other merits and details of the present invention will be made clear in embodiments thereof to be later described.

BRIEF DESCRIPTION OF THE DRAWINGS

FIG. 4 is a side view showing an example of a workpiece;

FIG. 5 shows an example of setting of control information by means of digital switches;

FIG. 6 is a view explanatory of a working mode;

FIG. 15($a$) is a diagram showing voltage control condition for a cutting tool driving dc motor;

FIG. 15($b$) is a diagram showing a cutting tool feed speed corresponding to the controlled condition of said dc motor;

FIG. 15($c$) is a diagram showing changes in the distance traveled by the tool associated at that time;

FIG. 16 is a plan view of a tool rest;

FIG. 17 is a flow chart showing a method of memorizing tool position in the X direction;

FIG. 18 is an explanatory view showing an example of a device for detecting a tool which is being used;

FIG. 19 is a flow chart showing a method of memorizing tool position in the Z direction;

FIG. 20 is a flow chart showing a method of correcting tool position in the X direction;

FIG. 27 is a view explanatory of an externally stepped workpiece;

FIG. 28 is a view showing an example of machining dimension indication;

FIG. 29 is a view showing an example of setting of machining allowance of the workpiece shown in FIG. 27;

FIG. 29$a$ is a view explanatory of a machining allowance setting digital switch;

FIG. 30 is a view showing how to arrange cutting tools;

FIG. 31 is a view explanatory of an example of setting of control information for control information setting digital switches;

FIG. 32 is a view explanatory of cutting tool feed condition for rough-cutting a first end face of a workpiece;

FIG. 33 is a flow chart showing a method of determining the cutting tool cutting feed start position;

FIG. 34 is a flow chart showing a machining cycle for rough-cutting the first end face of the workpiece;

FIG. 35 is a veiw explanatory of cutting tool feed condition for rough-cutting a second end face of the workpiece;

FIG. 36 is a flow chart showing a method of determining the cutting tool feed start position in that case;

FIG. 43 is a flow charts showing a machining cycle for rough-cutting the third outer surface of the workpiece;

FIG. 44 is a view explanatory of cutting tool feed condition for rough-cutting a second outer surface of the workpiece;

FIG. 45 is a flow chart showing a method of determining cutting tool cutting feed start position in that case;

FIG. 46 is a flow chart showing a machining cycle for rough-cutting the second outer surface of the workpiece;

FIG. 47 is a view explanatory of cutting tool feed condition for transfer to the start position for finish-cutting the second outer surface of the workpiece upon completion of rough cutting of the outer surface;

FIG. 48 is a flow chart showing a finish machining cycle and a method of determining the cutting tool finish cut start position in that case;

FIG. 49 is a view explanatory of an operation sequence in which machining takes place from FIG. 27 to FIG. 48;

FIG. 50 is a view explanatory of an internally stepped workpiece;

FIG. 51 is a view showing an example of machining dimension indication for the workpiece shown in FIG. 50;

FIG. 52 is a view explanatory of a cutting tool arrangement in that case;

FIG. 53 is an explanatory view showing an example of setting of control information for digital switches in the above case;

FIG. 60 is a view explanatory of an externally stepped workpiece being grooved;

FIG. 61 shows an example of setting of control information therefor;

FIG. 62 is a view explanatory of the machining operation of a groove-cutting tool prior to improvement;

FIG. 63 is a view explanatory of the machining operation of a groove-cutting tool after improvement; and FIGS. 64–66 are flow charts showing method of deciding the positioning of the cutting tool cutting feed start point in groove-cutting operation after improvement.

DESCRIPTION OF THE PREFERRED EMBODIMENTS

Figure 1:
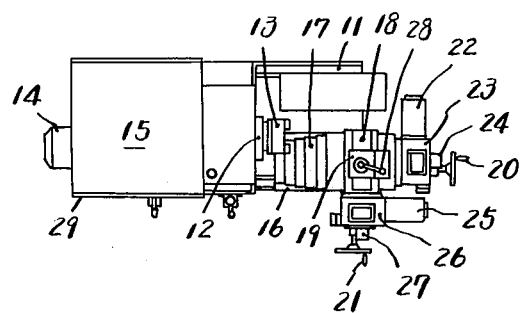
FIG. 1 is a plan view of a numerically controlled machine tool showing an embodiment of the present invention.
Figure 2:
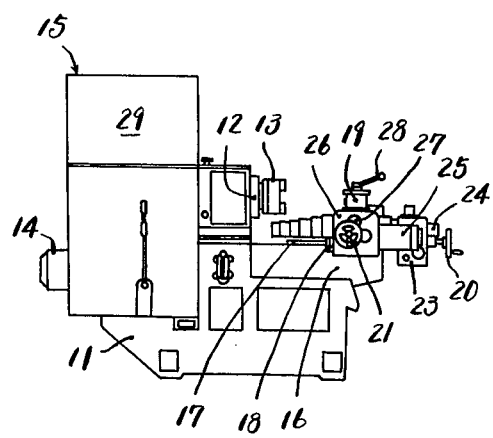
FIG. 2 is a front view of the same.
Figure 3:
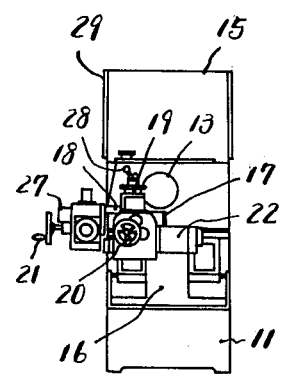
FIG. 3 is a right-hand side view of the same.

Reference is now to be had to FIGS. 1–3 wherein the machine tool apparatus made in accordance with the present invention includes a main machine body or base 11, a main shaft 12 operatively mounted on the machine body 11, a chuck 13 mounted on the main shaft 12, a drive motor 14 mounted on the body 11 for driving the main shaft 12, a control unit 15 mounted on the top of the apparatus, a bed 16 mounted on the top of the main body 11 forward of the main shaft 12, a slide table 17 operatively associated with the bed 16 for sliding movement relative thereto, a cross-slide 18 operatively associated with the slide table 17, a tool rest 19 operatively associated with the cross-slide 18, a longitudinal manual feed handle 20 operatively associated with the slide table 17, a longitudinal manual feed handle 21 operatively associated with the cross-slide 18, a longitudinal drive DC motor 22 having a gear box 23 operatively associated with the slide table 17, a longitudinal position detector 24 operatively associated with the slide table 17, a transverse drive DC motor having a gear box 26 operatively associated with the cross-slide 18, a transverse position detector 27 operatively associated with the cross-slide 18, a tool rest clamp lever for locking the tool rest 19 to the cross-slide 18, and an operating panel 29 mounted on the control unit 15. motor; 26, a gear box therefor; 27, a transverse position detector; 28, a tool rest clamp lever; and the character 29 designates an operating panel.

A workpiece (not shown) is gripped by the chuck 13 and the latter is rotated by the main shaft drive motor 14. The rpm of the main shaft 12 can be set in several steps, as is known in the art.

A cutter (not shown) is secured to the tool rest 19 by a known method while the tool rest 19 is revolvably mounted on the cross slide 18 and locked to the latter by the tool rest clamp lever 28. The cross slide 18 is transversely slidably mounted on the slide table 17 while the latter is longitudinally slidably mounted on the bed 16. Further, the cross slide 18 is arranged so that it can be transversely moved on the slide table 17 by the transverse drive dc motor 25 or transverse manual feed handle 21 through a known feed screw mechanism. The slide table 17 is arranged so that it can be longitudinally moved on the bed 16 by the longitudinal drive dc motor 22 or longitudinal manual feed handle 20 through a known feed screw mechanism.

In brief, the cutter is installed in such a manner that it can be moved to and fro longitudinally and transversely of the lathe. The movements in these two directions are detected by the position detectors 24 and 27. The performance of the detectors 24, 27 is such that they respond to a move of 1/100 mm to produce an electric signal in the form of a pulse which is then fed back to a control unit. Electric signals emitted from the detectors 24, 27 are fed into a calculating circuit in the control unit. The calculating circuit calculates said signals and feeds the results into servo circuits, which drive the corresponding dc motors 22 and 25. That is, the servo mechanisms are of the semi-closed type.

According to the present invention, the cutter is caused to execute motion in accordance with a predetermined mode pattern in the longitudinal direction (hereinafter referred to as the Z direction) and transverse direction (hereinafter referred to as the X direction) of the lathe. Such mode pattern is obtained by forming inside the control unit an electric control circuit corresponding to a template or master pattern as in the copying lathe. The individual mode pattern is a pattern peculiar to its mode and adapted to cause the cutter to execute cyclic motion in the Z and X directions in the sequence system, the arrangement being such that the amounts of movement in the Z and X directions can be variably set in a software fashion through digital switches. Further, it is so arranged that each mode pattern can be selected by a selection switch and that such selecting operation can be manually preset by the operator.

The mode patterns described above are classified into 9 modes. Thus, mode 1 signifies external cutting; mode 2, internal cutting; mode 3, facing; mode 4, grooving; mode 5, chamfering; mode 6, drilling; mode 7, boring; mode 8, tapering; and mode 9 designates screw cutting. In addition, mode 0 signifies the absence of setting of any such mode. Each of these modes 1–9 can be selected through a single shiftable digital switch.

In brief, the present invention enables the operator, looking at a design drawing, to preset the machining dimensions entered in the design drawing with respect to the Z and X directions and select the modes suited to the particular machining out of said mode patterns and preset them through digital switches. Other information necessary for the machining is, of course, preset through digital switches, as will be later described.

The most simple example of the application of the present invention will now be described with reference to FIG. 4.

A workpiece shown in FIG. 4 is a round bar whose outer diameter is $D_0$ and length is $L_0$ and in this example it is to be externally cut to reduce the outer diameter to $D_1$ over a length $L_1$ as measured from one end of the round bar.

In this case, if $D_0=150$, $D_1=100$, $L_1=120$ and external cutting is represented by mode 1, then these values are set directly into digital switches, as shown in FIG. 5. Thereby, the control unit memorizes these items of control information in the corresponding registers. Since the electric circuits and devices used herein for this purpose are known in the art, a complete description thereof will not be given herein.

In the actual machining, besides said control information, the following control information is required.

The necessary data is the depth of cut $\gamma$ per cutting stroke of the tool, finishing allowance $\delta$, the rpm of the main shaft and the cutting feed speeds in the X and Z directions, respectively. Of these factors, the depth of cut $\gamma$ and finishing allowance are set to the standard values as usually determined by the machinist in this field of machine work through experience or in accordance with the material of the workpiece and machining conditions. Further, it is so arranged that the rpm of the main shaft and the cutting feed speed of the cutting tool can be step-wise set, and suitable speeds are selected and set by the respective digital switches.

Digital switches are also provided for these items of control information to memorize the latter in the corresponding registers in the control unit.

For external cutting, the cutting operation of the cutting tool is such that it is fed for cutting in the X direction through the depth of cut $\gamma$ per cutting stroke from the cutting start point $P_0$ and then fed for cutting in the Z direction through the preset machining dimension $L_1$ and is retracted through a small amount $\gamma$ in the X direction and quickly returned in the Z direction through $L_1$. This is one cycle of external cutting. Subsequently, the cutting tool is fed for cutting in the X direction through $(\alpha+\gamma)$ and then for cutting in the Z direction through $L_1$, retracted in the X direction through $\alpha$ and quickly returned in the Z direction through $L_1$. This is the second cutting operation. Thereafter, the same operation is repeated until the diameter of the workpiece is reduced to the machining dimension $D_1$. This mode of machining is hereinafter referred to as the incremental machining.

The value $\alpha$ is preset as a fixed value in the sequence circuit of the control unit. The $\alpha$ is for the purpose of avoiding interference between the cutting tool and the workpiece during the quick returning of the cutting tool in the Z direction. Its concrete value is of the order of 0.2 mm.

Figure 7:
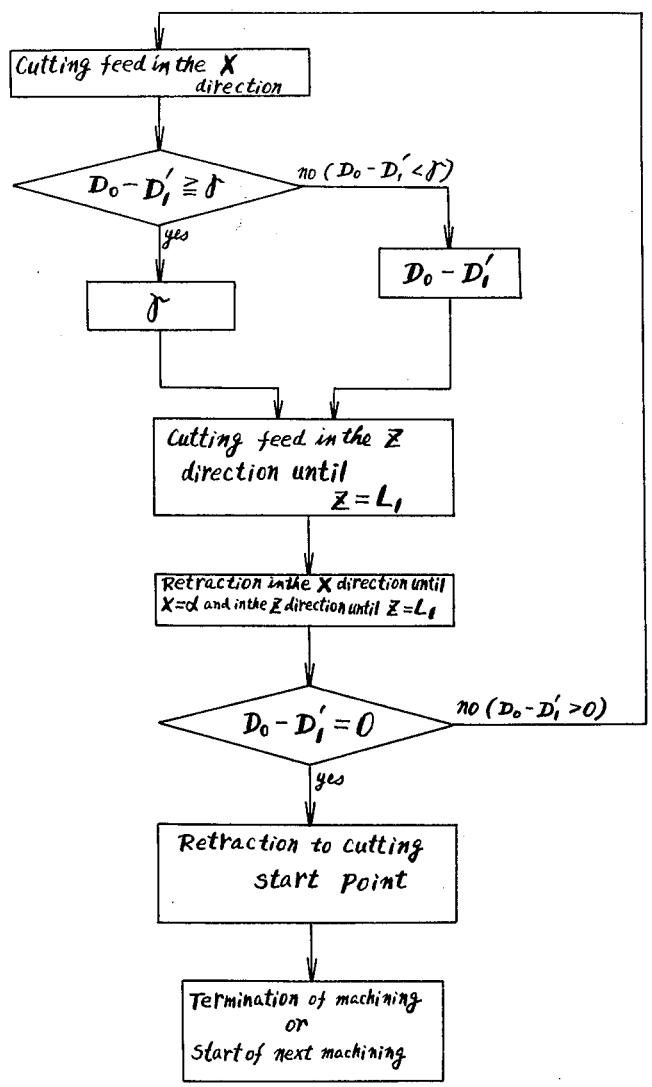
FIG. 7 is a flow chart of an external cutting cycle.

In the incremental machining described above, if the final depth of cut is less than the preset depth of cut $\gamma$, it is so arranged that such fraction is adopted as the final depth of cut. Such decision is incorporated in the control unit. Since the concrete electric circuit is complicate, a description thereof is omitted herein, but the outline of the circuit arrangement is shown in a flow chart in FIG. 7. It is to be noted that in FIG. 7, $D_1'$ indicates the changing diameter of the workpiece in the process of being cut as detected by a detector. In addition, the finishing allowance $\gamma$ has been left unsaid in the above description, but in actual machining, it often occurs that both rough cutting and finish cutting are done. In that case, the value $D_1'$ in FIG. 7 is to be replaced by $(D_1-\delta)$. In the concrete, it is so arranged that rough cutting is effected with such converted value. On the other hand, finish cutting is effected by once feeding the cutter for cutting in the Z direction through the length $L_1$ with the value $\delta$ taken as the depth of cut in the X direction.

The correction of position of the cutter will now be described. Generally, several cutters are fixed to the tool rest, but the distances of the tips of the cutters from the reference point (center point) will vary from each other depending upon the method of fixing employed. Despite this fact, the X and Z direction position detectors feed the movement of the tool rest back into the calculating circuit in the control unit. Therefore, there will be errors unless the position of the tip of each cutter is corrected in the calculating circuit. The following description is directed to the positional correction to avoid such errors.

Installed in the control unit are two independent calculating circuits for calculating the movements of the cutter in the X and Z directions. The calculating circuits are provided with circuits for counting the number of pulse signals fed from the X and Z direction position detectors (see FIGS. 1 through 3) and also with registers for memorizing the counts. They are capable of doing arithmetic operations. Moreover, the registers are arranged so that their values can be corrected from the outside, as described below.

Figure 8:
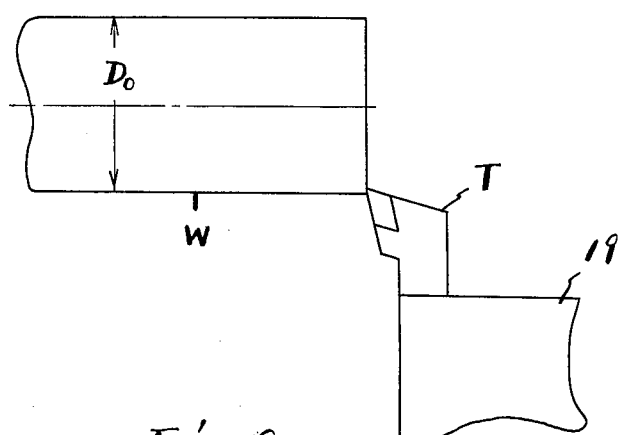
FIG. 8 is a plan view explanatory of how to correct the tool position in the Z direction.

First, the manner of making positional correction in the Z direction will be described. The manual feed handle is manipulated until the tool T on the tool rest 19 abuts against one end of the workpiece W gripped by the chuck of the lathe, as shown in FIG. 8. In this condition, the value in the Z direction register is corrected to zero. That is, one end of the workpiece W is made Z=0, whereby the movement of the tool rest 19 and tool T in the Z direction is memorized in the register. Thus, how much they have moved to the right (plus-direction) or to the left (minus-direction) is memorized in the register.

The above correction is made by providing a correction digital switch, setting its value to zero and pushing the correction switch (push button) in that condition. That is, said digital switch and register are electrically interconnected so that by the correction switch being pushed, the value in the register is corrected. The concrete electric circuits used herein are known in the art and hence a detailed description thereof is omitted.

Next, the positional correction in the X direction will be described. This is effected by externally cutting on trial the workpiece W already gripped by the chuck of the lathe using the tool T, measuring the outer diameter D of the cut portion of the workpiece W by an outer diameter measuring instrument such as slide calipers or a micrometer, setting the measured value D in the X direction correction digital switch and pushing the correction switch (push button) to correct the value in the X direction register to said measured value D. In addition, how far the tip of the tool T is spaced apart from the center of the chuck is directly memorized in the X direction register in terms of a diameter. This is as good as the memorizing of the radial distance from the center of the chuck. To this end, it is so arranged that the value in the detector for feeding the movement of the tool T in the X direction is converted into a diametrical dimension before it is fed into the register.

The X direction correction digital switch and register are interconnected by a known electric circuit.

The above is the principle of the method of correction of tool position. When the positional correction of the tool is carried out in the manner described above, the values in the X and Z direction registers memorize the movement of the tip of the tool and these values are fed back into the control unit. Therefore, the dc motor for driving the tool rest is correctly driven in accordance with a value obtained by comparison between the set value of the machining dimension and the memorized value in the position register memorizing the present position as measured from the tool rest position detector.

When the machining according to FIG. 4 is actually performed, the tool rest or tool is quickly moved from a given position to one end of the workpiece represented by Z=0 and X=$D_0$+2α, from which it is changed over to cutting feed to carry out external cutting in the external cutting cycle described above. In addition, the purpose of adopting $D_0$+2α rather than $D_0$ as the X direction cutting feed start position is to prevent the tip of the tool from striking the workpiece. That is, cutting feed is started at a position closely adjacent to the workpiece (2α short of the workpiece).

The method of control of cutting feed speed will now be described.

It is important to a numerically controlled machine tool that the tool be accurately stopped at a predetermined position.

Figure 10:
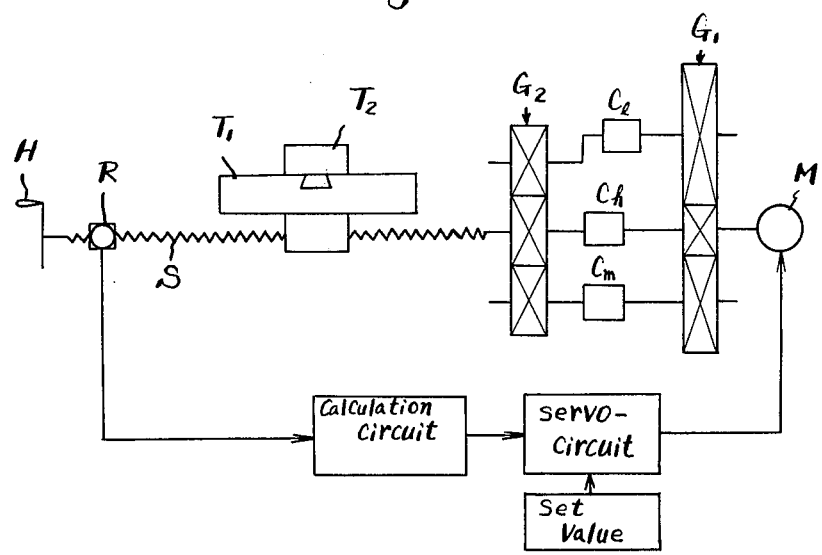
FIG. 10 is schematic view of a feed mechanism for a tool rest slide.

FIG. 10 is a schematic view of a tool rest feed mechanism, in which $T_1$ designates a slide table; $T_2$, a tool rest; S, a table feed screw; M, a dc drive motor; $G_1$, a speed change gearing; $G_2$, a transmission gearing; and Ch, Cm and Cl designate clutches. The character H designates a handle and R, a position detector. In addition, it is so arranged that the tool rest $T_2$ is moved on the table $T_2$ by a feed screw and a dc drive motor, and its feed screw is provided with a handle and a position detector (not shown).

Any one of the clutches Ch, Cm and Cl is selected to change the rotative speed of the feed screw and hence the feed speed of the table $T_1$. Thus, the engagement of the clutch Ch gives a feed speed Sh in a high speed region; the engagement of the clutch Cm gives a feed speed Sm in a medium speed region; and the engagement of the clutch Cl gives a feed speed Sl in a low speed region. In addition, the reduction of speed between successive speed regions is effected by voltage control of the dc motor.

The clutches Ch, Cm and Cl are controlled by a subtraction control mechanism beforehand installed in the machine in the following manner.

Figure 11:
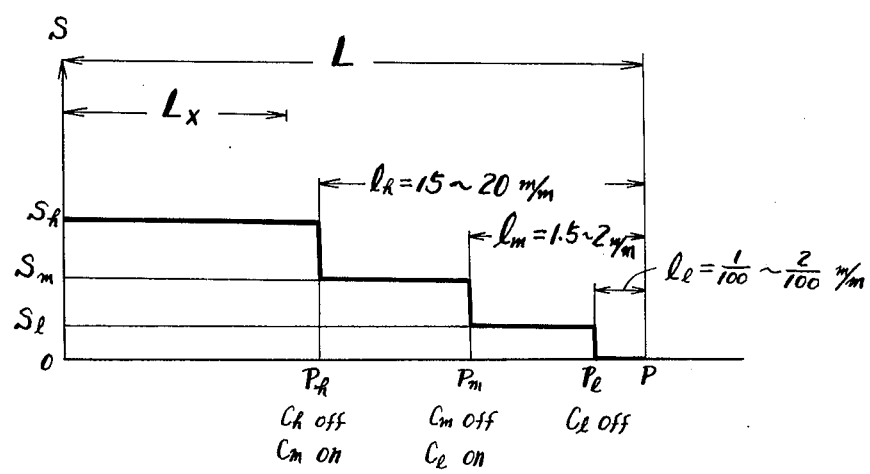
FIG. 11 is a diagram showing feed position control.

As shown in FIG. 11, P represents the leading end of the Table $T_1$ (terminal end of feed according to control information); a position Pl spaced a predetermind distance, e.g., 1/100–2/100 mm apart from said P represents a clutch Cl disengagemant position; a position Pm spaced 1.5–2.0 mm apart therefrom represents a position where the clutch Cm is disengaged and the clutch Cl is engaged; and a position Ph spaced 15–20 mm apart therefrom represents a position where the clutch Ch is disengaged and the clutch Cm is engaged, these positions being fixedly set and memorized in the control unit in advance.

The positions Ph, Pm and Pl are determined in such a manner that when the result of subtraction of the present cut length $L_x$ from the preset cut length L becomes equal to the distance from the leading end position P to the position Ph, Pm or Pl, a signal is emitted. This signal brings about the disengagement of the corresponding clutch.

More particularly, during machining, the traveled distance $L_x$ is always subtracted from the cut length L and when the value (L−$L_x$) becomes $l_h$=15–20 mm, the clutch Ch is disengaged and the clutch Ch is engaged to reduce the speed from the high speed region Sh to the medium speed Sm. Likewise, when L−$L_x$ reaches lm=1.5–2.0 mm, the clutch Cm is disengaged and the clutch Cl is engaged to reduce the speed from the medium speed region Sm to the low speed region Sl. Finally, when L−$L_x$ reaches $l_l$=1/100–2/100 mm, the clutch Cl is disengaged so that the table $T_1$ is moved to the leading end position P by inertia, where it is accurately stopped.

Figure 12:
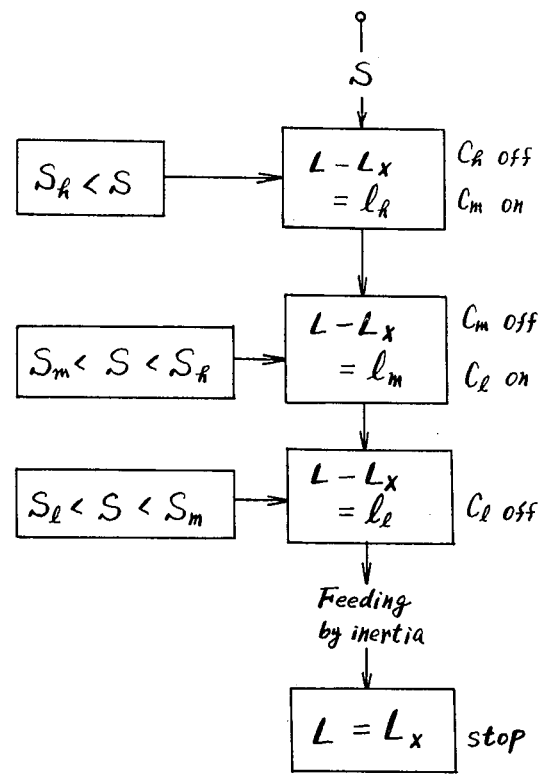
FIG. 12 is a flow chart showing feed position control.

The change of traveling speed of the table $T_1$ is effected in the manner shown in FIG. 12. That is, the present traveling speed $S_h$ is compared with the three speeds at all times when S>$S_h$, the table continues to travel at that speed until L−$L_x$=$l_h$=15–20 mm, and at the position $P_h$, the speed is changed to Sm. Thereafter, it is changed to Sl and the clutch Cl is disengaged at the position Pl. The table $T_1$ is completely stopped at the leading end position P. When the present traveling speed S is given by Sm<S<Sh, the table continues to travel at that speed until L−$L_x$=lm=1.5–2.0, and the speed is changed to Sl at the position Pm. When the present traveling speed S is given by Sl<S<Sm, the cutch Cl is disengaged at the position Pl.

By reducing the speed at a position adjacent to the leading end position of the table and tool rest, as described above, the overrunning of the tool is prevented and accurate operation is performed. This feed control is applied to all of the quick feed, quick return and cutting feed of the tool.

In addition, the following control system may be applied to the cutting feed of the tool.

Figure 13:
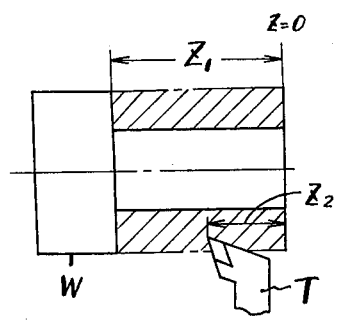
FIG. 13 is a machining explanatory view showing the relation between a workpiece and a cutting tool.
Figure 14:
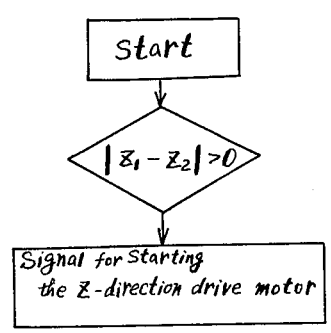
FIG. 14 is a flow chart showing a method of drive control in the Z direction.

As shown in FIG. 13, a workpiece W has a machining dimension $Z_1$ set therein and the movement of the tool T is detected in terms of a distance $Z_2$ from one end of the workpiece W where Z=0. Further, it is so arranged that when $|Z_1-Z_2|$>0, a signal is emitted to drive the tool in the Z direction, as shown in FIG. 14. When such signal is given, the control unit generates a voltage to rotate a tool feed dc motor. It is also arranged that the progress of the voltage is as shown in FIG. 15a. That is, with the elapse of time from $t_0$ to $t_1$ the motor input voltage is elevated to a voltage $V_1$ corresponding to the preset cutting speed, said voltage $V_1$ being maintained for a length of time from $t_2$ to $t_3$ and then decreased to $V_c$ which is maintained for a predetermined period of time until it becomes zero at time $t_4$.

The voltage $V_c$ is the lowest voltage for rotating the tool feed dc motor and it is what is generally called the creep voltage.

Said period of time from $t_0$ to $t_1$ changes in proportion to the preset speed voltage $V_1$ as in the case of control of dc motor start voltage, but the period is relatively short. This control is achieved by setting and memorizing the cutting speed of the tool in a register in terms of a voltage value, providing a variable resistor such as Slidac (a product of Tokyo Shibaura Electric Co., Ltd.) in the starting circuit of the dc motor to thereby elevate the starting voltage at a fixed rate until it is equal to a preset voltage in said register, whereupon the elevation of the starting voltage by the variable register is terminated, the voltage thus reached being maintained thereafter.

The detection of time $t_2$ is achieved by memorizing the voltage $V_c$ in a register in advance, using a separate register capable of setting and memorizing the machining dimension in terms of a voltage value $V_a$, converting the movement of the tool per unit length (1/100 mm) into pulse signals each of which is then converted into a predetermined voltage $V_b$, which is successively subtracted from said machining dimension voltage value $V_a$, until the differential voltage is equal to $V_c$, which point of time is taken as $t_2$. In this case, the relation between $V_a$ and $V_b$ is $V_a = nV_b$ where $n$ represents the number of pulse signals. Therefore, the time $t_2$ is reached when $V_a - nV_b = V_c$, where $V_b$ is a voltage corresponding to a move of 1/100 mm of the tool and is somewhat less than $V_c$. The time $t_3$ is reached when the voltage across the dc motor becomes equal to $V_c$ as it is decreased from time $t_2$.

The distance to be traveled by the tool at voltage $V_c$ is 1/100–2/100 mm and it is 1/100–2/100 mm short of the position where the machining of the predetermined machining dimension is completed.

Further, $t_4$ is reached when $V_a - nV_b = 0$, or when the machining of the predetermined machining dimension by the tool is completed.

According to the control described above, the feed speed is very low toward the end of the machining of a predetermined dimension and hence the overrun is very small, being usually within 0.005 mm with respect to the machining dimension. Therefore, the machining accuracy is improved.

When voltage control is effected according to FIG. 15a, the relation between the tool feed speed and time is proportional to the voltage control, as shown in FIG. 15b, and the relation between the distance traveled by the tool rest and time is as shown in FIG. 15c.

A concrete arrangement will now be described.

Generally, the tool rest is designed so that a plurality of tools can be attached thereto. Thus, some tools necessary for particular machining are attached to the tool rest in advance, so that upon completion of cutting by one tool, the next tool is employed to perform the next cutting, thereby improving the efficiency of machining.

In order to provide such function, the present invention is arranged as follows.

FIG. 16 shows a tool rest 30 adapted to have 4 tools attached thereto. The tool rest is marked No. 1, No. 2, No. 3 and No. 4 corresponding to tool attaching positions.

Present-position memorizing registers are installed in the control unit corresponding to the tool attaching positions on the tool rest.

The present position of the tool rest is memorized in terms of its X and Z direction components.

Therefore, it is so arranged that the X direction present-position memorizing registers are simultaneously fed by a single X direction position detector with detected values. This is schematically shown in FIG. 17. In addition, in FIG. 17 there are 4 present-position memorizing registers designated at 31, 32, 33 and 34 by making use of the marks indicating the tool attaching positions on the tool rest. The present-position memorizing registers 31, 32, 33 and 34 are adapted to feed the present position of the tool rest 30 back to an X direction indicating section 39 and an X direction driving section 40 through respective tool rest switches 35, 36, 37 and 38.

The tool rest switches 35, 36, 37 and 38 are arranged so that only one of them which corresponds to a tool now in use located in one of the 4 tool attaching positions is closed while the remaining switches are opened. That is, in FIG. 17, it is only the value in the memorizing register for the tool now in use that is fed back to the X direction indicating section 39 and X direction driving section 40. As a result, accurate driving of the tool now in use is achieved within the control unit.

Various arrangements of the tool rest switches 35, 36, 37 and 38 may be conceived. For example, as shown in FIG. 18, 4 projections 41, 42, 43 and 44 are provided corresponding to the tool attaching positions on the tool rest 30 and there are 2 switches A and B associated with said projections and adapted to cooperate with the switches shown in FIG. 17 to turn them ON and OFF in accordance with the conditions shown in the following table.

|  | Switch A | Switch B |
|---|---|---|
| No. 1 switch 35, ON | OFF | ON |
| No. 2 switch 36, ON | ON | ON |
| No. 3 switch 37, ON | ON | OFF |
| No. 4 switch 38, ON | OFF | OFF |

Exactly the same arrangement is also used to connect Z direction present-position registers 45, 46, 47, 48 to a Z direction position register 49 and to a Z direction indicating section 50 and a Z direction driving section 51 through tool rest switches 35', 36', 37' and 38' (see FIG. 19).

Further, tool rest present-position memorizing registers are arranged so that they can individually correct the memorized values by tool position correcting circuits.

That is, as shown in FIG. 20, the X direction position correcting circuit is arranged so that a value set by an X direction correction value setting dial 52 is read in a read circuit 54 by closing a correction switch 53 and that only the value in the position memorizing register corresponding to the tool now in use is corrected through tool rest switches 35'', 36'', 37'' and 38''. These tool rest switches have the same operating function as those described above.

Figure 21:
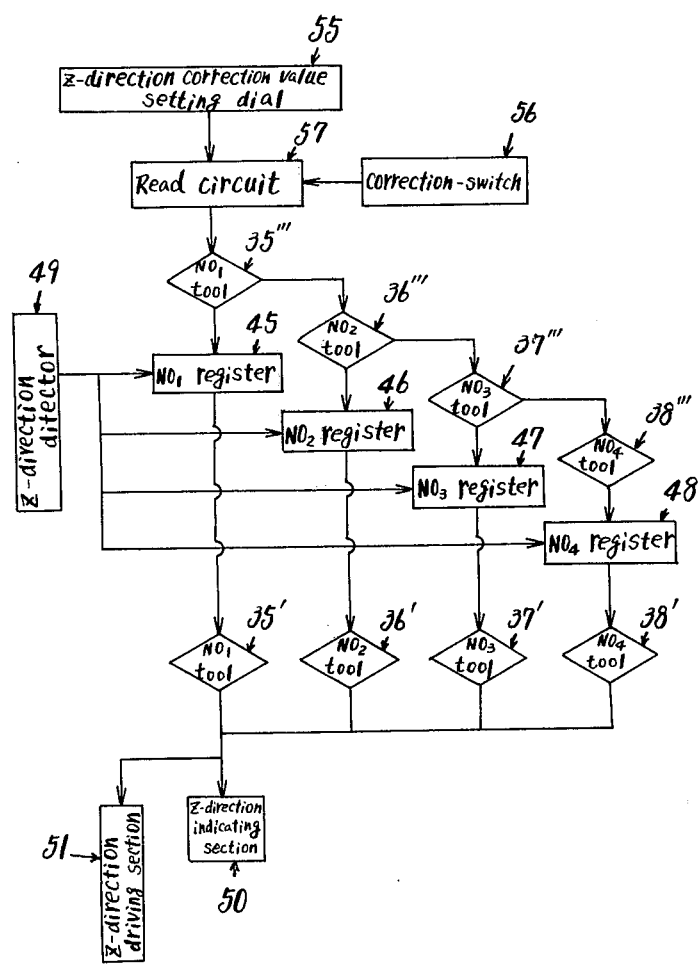
FIG. 21 is flow chart showing a method of correcting tool position in the Z direction.

Further, the X direction position correcting circuit, as shown in FIG. 21, is arranged so that a value set by a Z direction correction value setting dial 55 is read in a read circuit 57 by closing a correction switch 56 and that only the value in the position memorizing register corresponding to the tool now in use is corrected through tool rest switches 35''', 36''', 37''' and 38'''.

Figure 9:
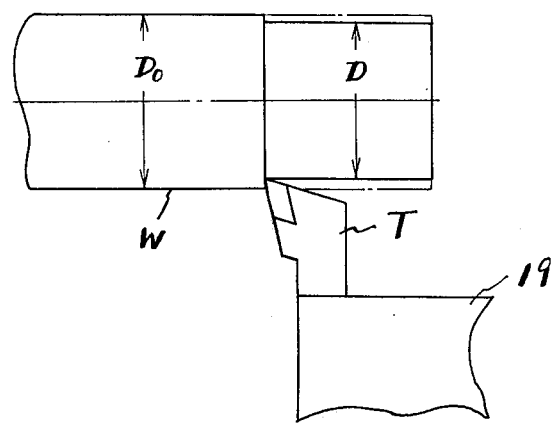
FIG. 9 is a plan view explanatory of how to correct the tool position in the X direction.

The X and Z direction position correction described above will be understood by reference to the description given above with reference to FIGS. 8 and 9.

A tool position correction will now be described which is employed in the case where a plurality of workpieces of the same shape are continuously machined.

In such case, after the first workpiece has been gripped by the chucking device of the lathe, the value in each register is corrected for each tool in the manner shown in FIGS. 8 and 9. This results in at least the X direction position of each tool being memorized in the associated X direction register in terms of its present position as measured from the center of the chucking device. Therefore, positional correction becomes unnecessary except when a tool is removed from the tool rest for replacement by a fresh tool. Stated differently, once the position of each tool is corrected in the X direction, positional correction is no longer necessary. However, when it is replaced by a fresh tool, the positional correction of the latter is necessary.

Figure 22:
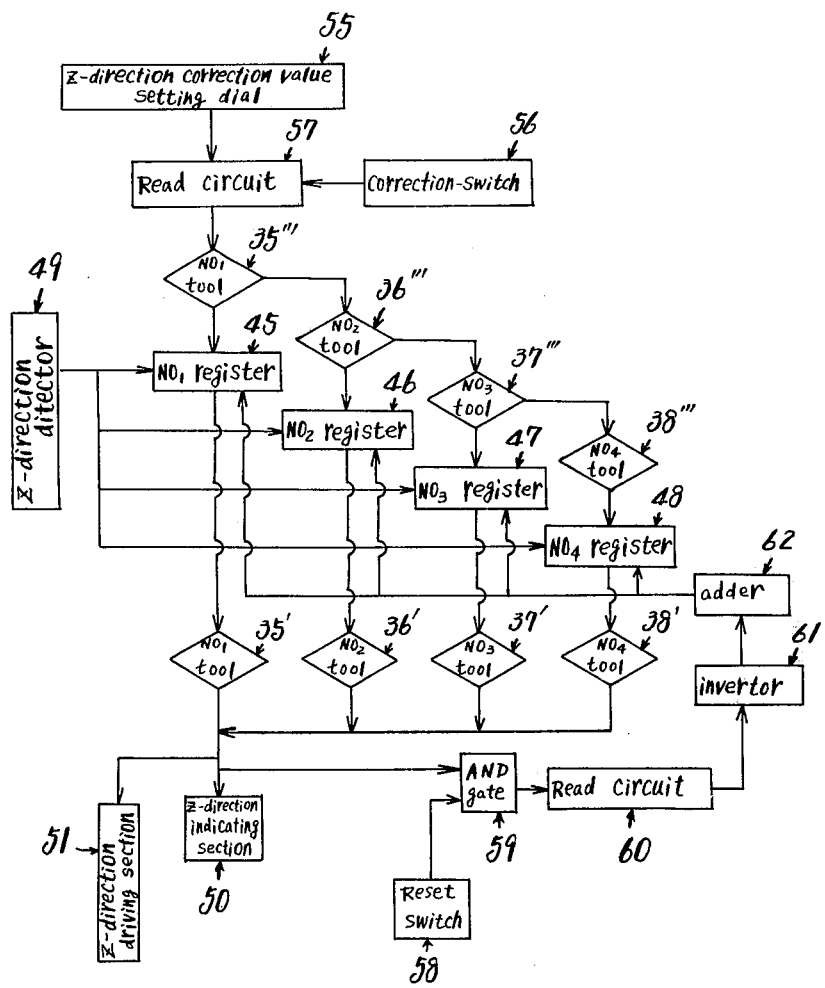
FIG. 22 is a flow chart showing a method of correcting tool positions in the Z direction in unison.

On the other hand, as for the Z direction, it is necessary to correct the memorized values in the Z direction position correcting registers each time the workpiece is replaced by a fresh one. That is, since the origin of the position of the tool rest in the Z direction is on the end face of a workpiece, each time it is replaced, the position of the end face of the workpiece is changed, so that the positional correction of the origin is necessary. In this case, the correction of the values in the 4 Z direction position correcting registers could be made separately by the correcting circuit shown in FIG. 21, but this would require much time and labor. A circuit shown in FIG. 22 is adapted to make such correction in unison. In addition, members corresponding to those shown in FIG. 21 are designated by like reference characters. Each time the workpiece is replaced, one of the 4 tools is brought against the end face of the workpiece and in this condition a reset switch 58 in FIG. 22 is closed so that the memorized value in the Z direction position memorizing register corresponding to said particular tool is read in a read circuit 60 through an AND gate 59, said value being inverted by an inverting circuit 61 and then added to Z direction position memorizing registers 45, 46, 47 and 48. For example, suppose that when a tool located at No. 1 position on the tool rest is brought against the end face of the workpiece, the value in the Z direction position memorizing register 45 for that tool is +10. This value is read in the read circuit 60 and inverted in the inverting circuit 61 into −10, which is then added in unison to the Z direction position memorizing registers 45, 46, 47 and 48. As a result, the value in the Z direction position memorizing register 45 for the tool at the No. 1 position on the tool rest is made 0 and +10 is subtracted from the values in the other Z direction position memorizing registers 46, 47 and 48. In this case, since the positional deviation among the Z direction position memorizing registers 45, 46, 47 and 48 for the 4 tools on the tool rest will not change at the time of replacement of the workpiece, it is only necessary to make positional correction of the origin each time the workpiece is replaced. In addition, when a tool is replaced by a fresh one, it is only necessary to make positional correction of the corresponding one by the position correcting circuit shown in FIG. 21.

In order to accelerate the arithmetic operation between the X and Z direction position detectors and position memorizing registers and simplify the arithmetic circuit, the following arrangement may be made.

That is, in the preceding embodiment, the values in the position memorizing registers are arithmetically treated in unison. Therefore, the same number of arithmetic circuits as that of registers have to be used and hence the construction becomes complicate and the calculating speed is slow.

The following embodiment provides improvements in this respect, the underlying principle thereof being based on our attention to the fact that what really requires arithmetic operation is only with respect to the value in the position memorizing register corresponding to the tool now in use.

Figure 23:
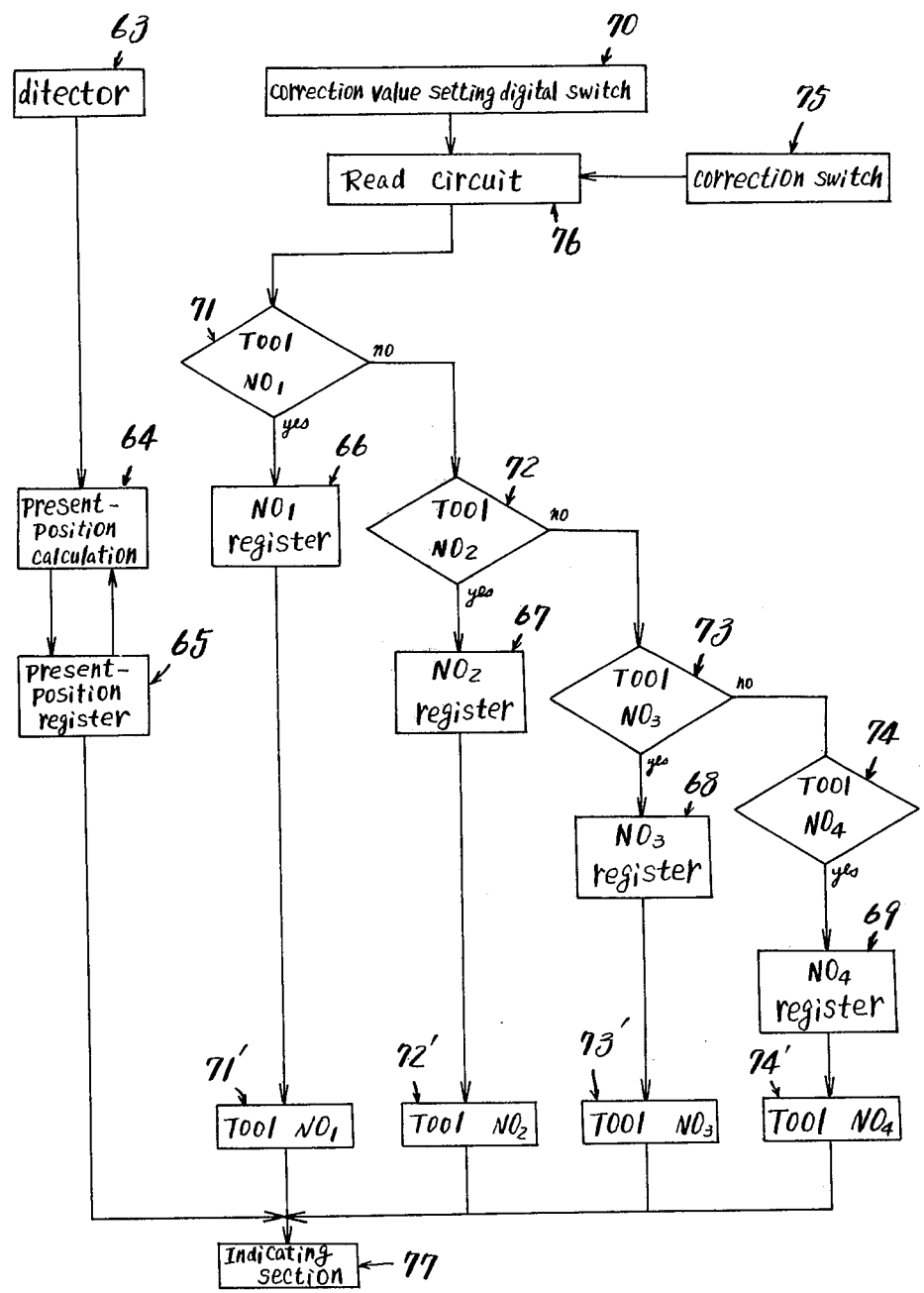
FIG. 23 is a flow chart of an arithmetic operation circuit for memorizing the present position of a tool.

This embodiment, as shown in FIG. 23, uses a single present-position arithmetic circuit 64 and a single presentposition memorizing register 65 with respect to a position detector 63. This is independent of the number of tools on the tool rest. And, as members which correspond to the tools, there are employed position correcting registers. In FIG. 23, 4 position correcting registers 66, 67, 68 and 69 are shown. These position correcting registers are arranged so that they memorize a value which is obtained by subtracting a correction value set by a correction value setting digital switch 70 from the value in the presentposition memorizing register 65. In this case, the correction value memorizing operations of the position correcting registers 66, 67, 68 and 69 are individually carried out, and to this end, use is made of tool rest switches 71, 72, 73, 74 and 71', 72', 73', 74', as shown in FIG. 23. That is, the correction value memorizing operation of the individual position correcting registers is effected in such a manner that only the position correcting register corresponding to the tool which is in a usable position compares the present value in the present-position memorizing register 65 with the set value in the correction value setting digital switch 70. The correction value memorizing operation in this case is effected by closing the correction switch 75 serving as a gate to the read circuit 76 for the correction value setting digital switch 70.

Further, whether the correction value memorizing operation of the position correcting registers 66, 67, 68, 69 has been correctly carried out or not can be ascertained in that when the correction value setting operation is carried out with respect to the position correcting registers 66, 67, 68, 69, the same numerical value as that set by the correction value setting digital switch 70 is indicated at the indicating section 77 in FIG. 23.

That is, it is so arranged that the numerical value indicated at the indicating section 77 shows the present position of the tool now in use on the tool rest. The same electric output as the numerical value indicated at the indicating section 77 is fed back to the control unit of the tool rest driving section.

Although the above description has made no distinction between the X and Z directions of the tool rest, the arrangement shown in FIG. 23 is used for each of these two directions.

The positional correction of each tool in said two directions is made in the manner described with reference to FIGS. 8 and 9. Further, in order to correct the origins of the registers in unison each time the workpiece is replaced, the unisonous correction circuit shown in FIG. 22 may be applied to each of the position correcting registers 66–69 shown in FIG. 23.

Figure 24:
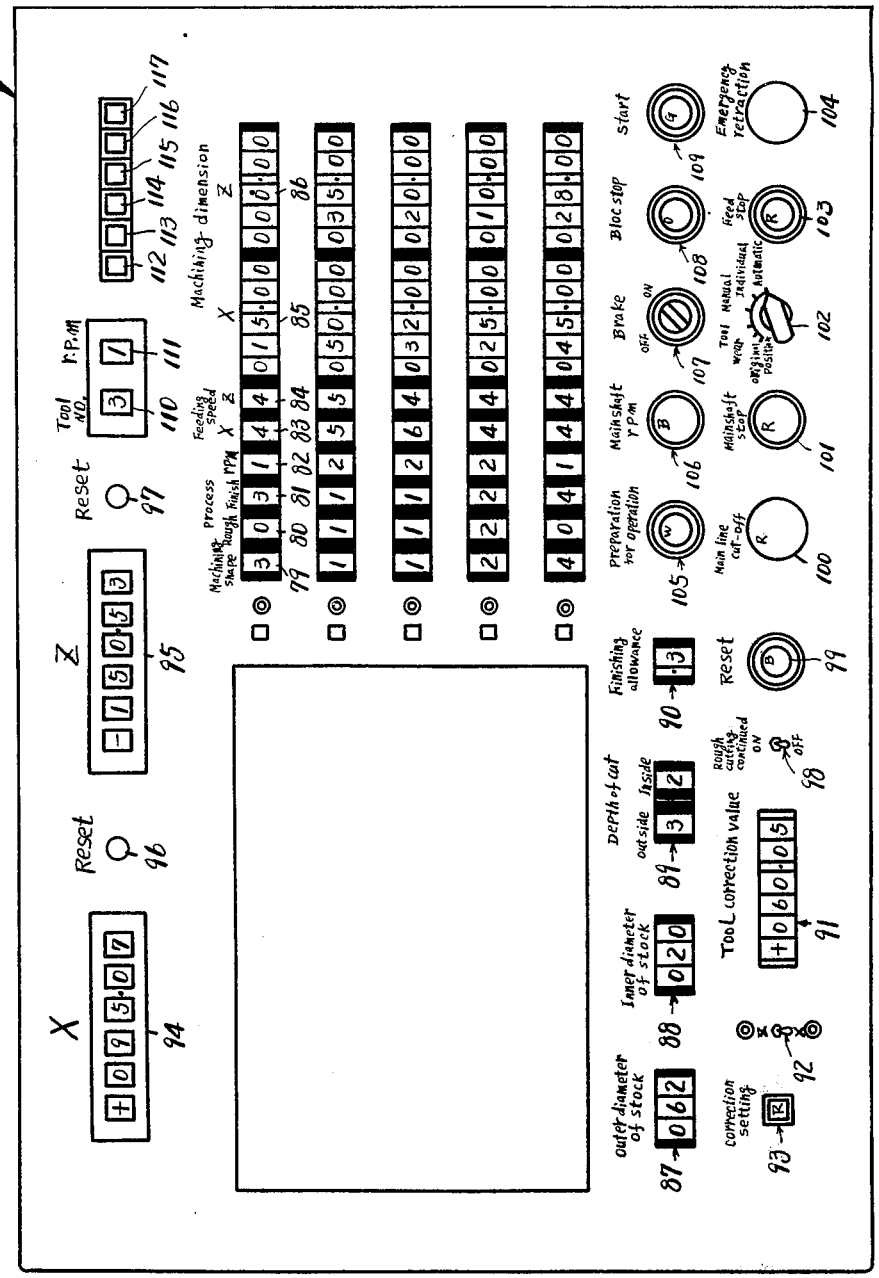
FIG. 24 is a front view of a control panel in a concrete form.

The switches for positional correction of tools and for setting various items of control information described thus far are arranged on a control panel 78 as shown in FIG. 24. On the control panel 78, there are mode setting digital switches 79 arranged in a vertical row and capable of setting 5 working modes, and arranged laterally of each mode setting digital switch are a rough cutting tool setting digital switch 80, a finish cutting tool setting digital switch 81, a main shaft rpm setting digital switch 82, an X direction feed speed setting digital switch 83, a Z direction feed speed setting digital switch 84, an X direction machining dimension setting digital switch 85 and a Z direction machining dimension setting digital switch 86 in the order mentioned.

The control panel 78 is also provided with a workpiece outer diameter setting digital switch 87, a workpiece inner diameter setting digital switch 88, a depth-of-cut setting digital switch 89 and a machining allowance setting digital switch 90.

The control panel 78 is also provided with a correction value setting digital switch 91 adapted to effect changeover between the X and Z directions by means of a snap type changeover switch 92. There is provided a correction switch 93.

The control panel 78 is also provided with an X-direction tool position indicator 94 and a Z direction tool position indicator 95, on which values from registers associated with a tool now in use are indicated. Arranged laterally of these indicators 94 and 95 are unisonous reset switches 96 and 97, respectively. When these switches are pushed, the values in the registers associated with the tool now in use are made O and the reset value is subtracted from the values in the other registers for the other tools.

Further provided on the control panel 78 are an on-off switch 98 for rough cut continuation, a reset button 99, a main line cut-off button 100, a main shaft stop button 101, an operation changeover switch 102, a feed stop button 103, an emergency retraction button 104, an operation preparation button 105, a main shaft rotating button 106, a brake changeover switch 107, a bloc stop button 108, a start button 109, a now-in-use tool No. indicator 110, a main shaft rpm indicator 111, a power indicating lamp 112, a control indicating lamp 113, an operation completion indicating lamp 114, a rough cut indicating lamp 115, a finish cut indicating lamp 116, and an abnormality indicating lamp 117.

Figure 25:
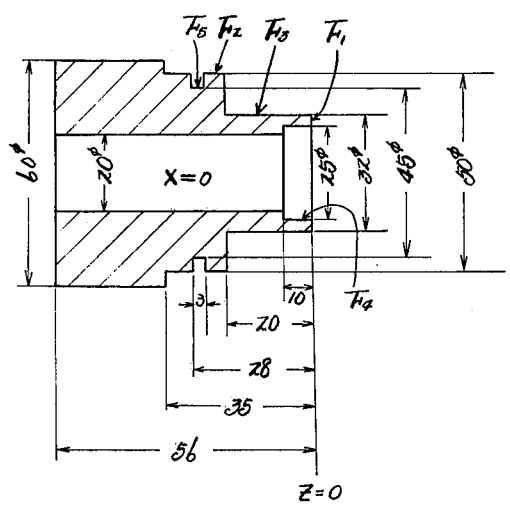
FIG. 25 is an explanatory view showing an example of a workpiece corresponding to the control information set in FIG. 24.
Figure 26:
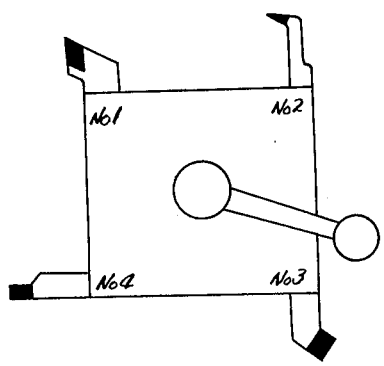
FIG. 26 is a plan view showing an example of attaching cutting tools to be used.

The digital switches shown in FIG. 24 have numerical values set therein for carrying out the machining of a workpiece shown in FIG. 25. The mode switch 79 in the first array in FIG. 24 has the mode 3 set therein, which signifies end face cutting. That is, it is intended to perform the end face cutting of the right-hand side end $F_1$ of the workpiece shown in FIG. 25. In this case, an end face cutting tool attached to the No. 3 position on the tool rest shown in FIG. 26 is used to effect finish cut alone, and the rough cutting tool setting digital switch 80 has been set to 0 signifying non-designation of tool. The finish cutting tool setting digital switch 81 has been set to 3 in order to use a tool located at the No. 3 position on the tool rest. Further, main shaft rpm and X and Z direction feed speeds have been set, the machining dimensions being 15 in the X direction and 0 in the Z direction. In this machining operation, since the machining dimension in the Z direction which is the cutting direction for incremental machining is 0, a single movement of the tool will complete the operation. In this case, the tool uses the workpiece outer diameter set value 62 as its X direction cutting start position while its start position in the Z direction is Z=0, that is, it is located on the right-hand side end of the workpiece. From this position the tool is fed by the set depth of cut 3 in the Z direction and then in the X direction until the set machining dimension 15 is attained.

The mode switch in the second array has set the external cutting of the portion $F_2$ of the workpiece in FIG. 25, the machining dimension in the X direction being set to 50, the machining dimension in the Z direction being set to 35. In this case, the tool in the No. 1 position on the tool rest shown in FIG. 26 is used and the position where Z=0 and X=62 is the start position for cutting feed. The machining cycle in this case is as described with reference to FIGS. 4–7, which see.

The mode switch in the third array has set the external cutting of the portion $F_3$ of the workpiece in FIG. 25.

The mode switch in the fourth array has set the internal cutting of the portion $F_4$ of the workpiece in FIG. 25 and in this case, the cutting feed start point is the position where Z=0 and X=20. The direction of incremental machining in the X direction is opposite to the direction for external cutting, that is, it is in the direction in which the internal diameter is to be enlarged. The tool to be used is the one located at the No. 2 position on the tool rest in FIG. 26.

The mode switch in the fifth array has set grooving of the portion $F_5$ of the workpiece shown in FIG. 25. In this case, the tool to be used is the one located at the No. 4 position on the tool rest shown in FIG. 26 and its cutting start point is at the position where X=62 and Z=28, from which position cutting feed in the X direction is imparted to the tool until the position where X=45 and Z=28 is reached. That is, incremental machining is not effected in grooving.

The modes described above are arranged so that if the tool to be used is the same (in FIG. 24, the second and third arrays), continuous machining is automatically effected. Further, if the same tool is used for both rough and finish cuts, it is so controlled that rough cut precedes without fail. If a different mode and a different tool are used or if the next mode is not designated, the next cutting will not take place and a buzzer or other alarm is actuated. In addition, exchange between tools on the tool rest is manually effected. Machining is started or restarted by closing the start button.

A description will now be given to the machining of the parallel shaded portions of a 3-stepped workpiece as shown in FIG. 27. In this case, it is supposed that the machining dimensions are as designated in FIG. 28. Let $l$ be the largest of the machining allowances $l_1, l_2, \ldots l_5$ and a digital switch for setting the $l$ is newly installed (see FIG. 29a). It is also supposed to use separate tools to effect the rough cutting of the end face and outer diameter. Thus, a tool for rough-cutting the end face is attached to the No. 1 position on the rest and another tool for rough-cutting the outer diameter is attached to the No. 2 position.

The working modes, tools, machining dimensions, depths of cut, finishing allowances and machining allowances are set by digital switches, as shown in FIG. 31. The digital switches marked "rough" and "finish" designate the tool Nos. to be attached to the tool rest, and X and Z specify machining dimensions in the two directions.

The settings shown in FIG. 31 indicate the rough cutting of the shaded end face of the workpiece in FIG. 31. In this case, the machining is started at point A with the No. 1 tool on the tool rest. The positioning of the point A is determined in the following manner. That is, a decision circuit for deciding whether or not the working mode setting digital switches in the first and second arrays have the same setting is incorporated in the tool driving control unit.

If the settings of the working modes in the first and second arrays are the same, a position which is defined as the sum of the second-array X direction set dimension $D_1$ and $2l+2\alpha$ is taken as the position of the point A in the X direction. In addition, $2l$ is the diametrical machining allowance and $2\alpha$ is a dimension with the safety of the tool in the diametrical direction taken into account, $\alpha$ being usually of the order of 0.2 mm and memorized as a fixed value in the tool drive control unit.

The position of the point A in the Z direction is defined as the first Z direction set dimension plus the end face machining allowance $l$ plus the tool safety factor $\alpha$, or $0+l+\alpha=l+\alpha$.

In addition, concerning the position of the point A in the X direction, if the working modes in the first and second arrays are different, said position is defined as the maximum outer diameter $D_0$ of the workpiece plus $2\alpha$.

The decision circuit for positioning the point A is shown in a flow chart in FIG. 33.

The cutting operation by the tool in the X direction continues until $X=0$ and in the X direction it continues until $Z=\delta/2$, where $\delta$ is the finishing allowance.

In addition, the first end face of the workpiece is shown in FIG. 32 as having a machining allowance $l$, but in some cases such machining allowance $l$ is not given and cutting with a single pass is effected with the depth of cut $\gamma$.

That is, as shown in FIG. 34, there is provided a circuit for deciding whether or not to give the first end face the machining allowance $l$ and the selection of said circuit is manually set by a changeover switch. That is, in the case of giving the machining allowance, incremental machining corresponding to $\gamma$ is effected from point A in the Z direction until $\delta/2$. That is, if the quotient of $(l+\delta-\delta/2)$ divided by $\gamma$ is an integer with a remainder, the incremental machining is effected with (said integer plus $l$) passes, and the depth of cut in the final pass is not but said remainder. If, however, said quotient has no remainder, the incremental machining is effected with the depth of cut $\gamma$ for each pass.

Eventually, the rough cutting of the first end face of said workpiece continues until the dimension in the Z direction is $Z=\delta/2$, that is, the condition shown in the lower left in FIG. 34 is attained.

The next operation is the rough cutting of the second end face of the workpiece. In this case, the tool is quickly returned to the position B as shown in chain line in FIG. 35. That is, in this case, since the working mode is continuously set, the position in the X direction is $X=D_2+2l+2\alpha$ and the position in the Z direction is $Z=-L_1+l+\alpha$. If, however, the working mode is discontinuously set, only the position in the X direction is $X=D_0+2\alpha$ (see FIG. 36).

Figure 37:
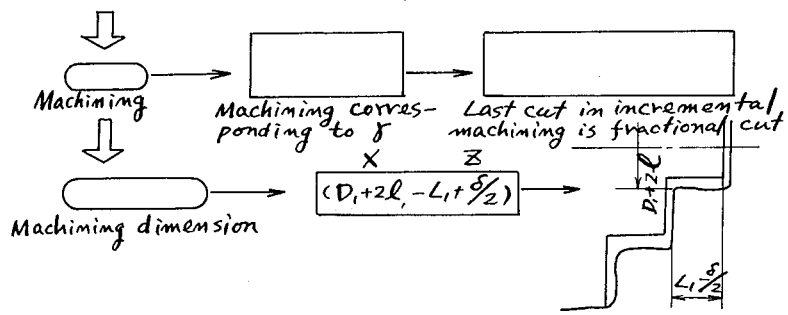
FIG. 37 is a flow chart showing a machining cycle for rough-cutting the second end face of the workpiece.

As for the machining, incremental machining corresponding to the depth of cut $\gamma$ is effected from said position B to a position where $X=D_1+2l$ and $Z=-L_1+\gamma/2$ (see FIG. 37).

In the incremental machining in this case, the tool is moved in the X direction from the $(D_2+2l+2\alpha)$ to the $(D_1+2l)$ position at cutting feed speed, somewhat retracted through in the Z direction, quickly returned, advanced through $(\alpha+\gamma)$ in the Z direction, from which position it is moved at cutting feed speed in the X direction until $(D_1+2l)$, such operation being repeated until $Z=-L_1+\delta/2$.

Figure 38:
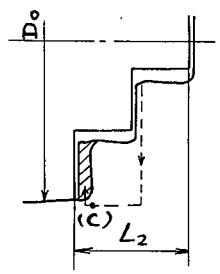
FIG. 38 is a view explanatory of cutting tool feed condition for rough-cutting a third end face of the workpiece.
Figure 39:
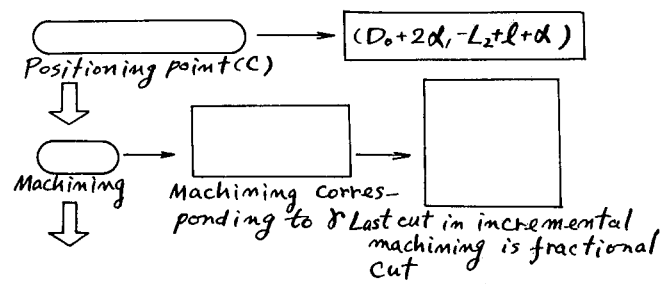
FIG. 39 is a flow chart showing a method of determining the cutting tool cutting feed start position in that case.
Figure 40:
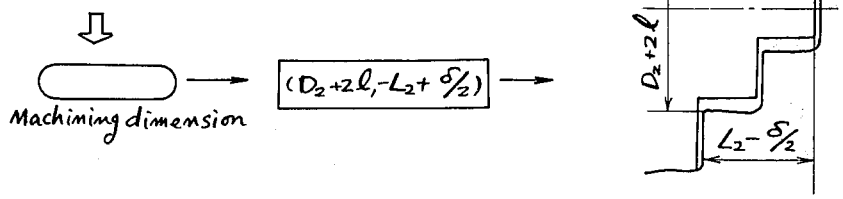
FIG. 40 is a flow chart showing a machining cycle for rough-cutting the third end face of the workpiece.

The next operation is the rough cutting of the third end face of the workpiece. The tool to be used in this case is moved at quick speed from the point of termination of the cutting of the second end face to a point C, as shown in chain line in FIG. 38. As for the positioning of the point C, the position in the X direction is defined as the maximum outer diameter $D_0$ of the workpiece plus $2\alpha$ and the position in the Z direction is defined as $Z=-L_2+l+\alpha$ (see FIG. 39). Incremental machining in accordance with the depth of cut is effected until $X=D_2+2l$ and $Z=-L_2+\delta/2$ (see FIG. 40). With the above operation completed, it follows that the rough facing of the workpiece has been completed. The operation then shifts to the external rough cutting of the workpiece. In this case, since it has been supposed that different tools will be used for rough facing and rough external cutting, exchange of tools has to be made at this point, though there are cases where one and the same tool is used for continuous machining.

The tool exchange is effected by automatically returning the tool to a predetermined position, at which a buzzer or other alarm is actuated to signal the operator to exchange tools manually or otherwise.

Figure 41:
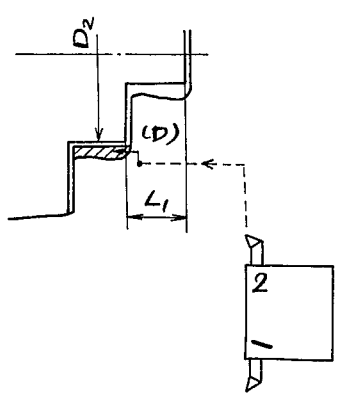
FIG. 41 is a view explanatory of cutting tool feed condition for rough-cutting a third outer surface of the workpiece.
Figure 42:
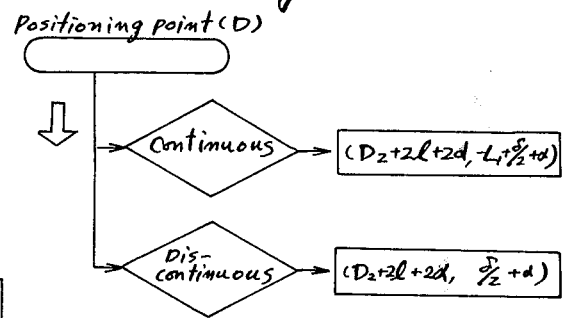
FIG. 42 is a flow chart showing a method of determining cutting tool cutting feed start position in that case.
Figure 54:
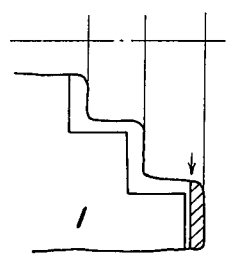
FIGS. 54–59 are explanatory views showing an operation sequence for the workpiece shown in FIG. 50.
Figure 55:
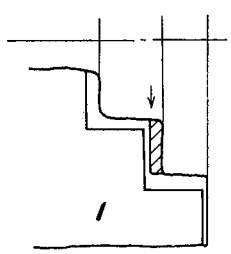
Figure 56:
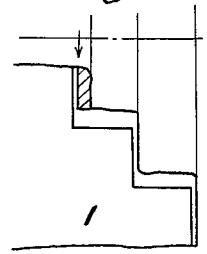
Figure 57:
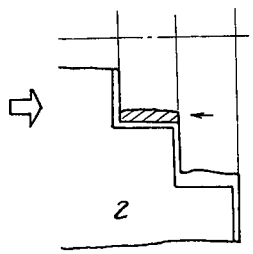
Figure 58:
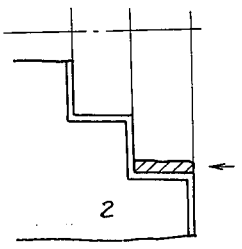
Figure 59:
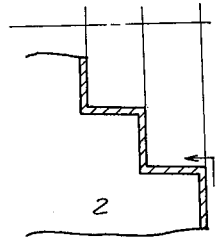

Upon completion of the tool exchange, the start button or the like is pushed to move the tool at quick speed from said predetermined position to a position D just short of the starting end of machining of the third outer surface of the workpiece along a path shown in chain line in FIG. 41. As for the positioning of the point D, the position in the X direction is defined as the machining dimension $D_2$ of the second outer diameter plus $2l$ and $2\alpha$ while the position in the Z direction is determined according to whether the setting of the working mode is continuous or not. That is, a decision circuit as shown in FIG. 42 is provided, and if the working mode is of continuous setting, the position on the Z axis is determined by reading the Z direction dimension $L_1$ in the second step, that is, the step which is one step before, and then subtracting $\delta/2+\alpha$ from $L_1$, thus giving $Z=-L_1+\alpha$ expressed in the coordinate system. If the working mode is of discontinuous setting, the position is $\delta/2$ short of the first end face $Z=0$ in consideration of the safety of the tool, that is, the position is defined as $Z=\delta/2+\alpha$.

The rough cutting of the third outer surface of the workpiece is effected by moving the tool at cutting feed from said D position in the Z direction until $Z=-L_1+\delta/2$ as shown in FIG. 43, returning the tool by a small amount in the X direction, quickly returning it to $Z=-L_1+\delta/2+\alpha$ in the Z direction, advancing it by $\alpha+\gamma$ in the X direction, again moving it at cutting feed in the Z direction until $Z=-L_2+\delta/2$, returning it by in the X direction, quickly returning it in the Z direction until $Z=-L_1+\delta/2+\gamma$, advancing it in the X direction by $\alpha+\gamma$, and again moving it at cutting feed in the Z direction until $Z=-L_2+\delta/2$ (which is referred to as incremental machining), such operation being repeated until the dimension in the X direction is $D_2+2\delta$.

When the rough cutting of the third outer surface of the workpiece is completed in the manner described above, the tool is moved at quick feed to the start point E of the rough cutting of the scond outer surface in a path shown in FIG. 44. This point E has its position in the X direction defined as the machining dimension $D_1$ of the second outer surface plus $2l$ and $2\alpha$ and its position in the Z direction is located slightly short of the first end face of the workpiece where $Z=0$. In this case, the first end face has already been roughly cut and hence $Z=\delta/2+\alpha$ (see FIG. 45). The rough cutting of the second outer surface is effected by repeatedly moving the tool in the Z direction from the point E to $Z=-L_1+\delta/2$ while inching the tool in the X direction by $\gamma$ in each pass, the dimension in the X direction is $X=D_1+2\delta$ (see FIG. 46).

If the next external rough cutting (of the first outer surface, in this case) has been set such that $X=0$ and $Z=0$, external cutting will be automatically neglected and shifted to the next machining.

The incremental machining described thus far is the so-called rough cutting fixed cycle of tools and this fixed cycle is a square motion in the X and Z directions and adapted so that the amounts of movement in the X and Z directions can be set by means of digital switches. And, it is so arranged that depending whether the operation is facing or external cutting, the direction of incremental machining by the depth of cut $\gamma$ is automatically specified and that corresponding thereto the set dimension in the other direction becomes the reciprocating stroke. However, it is so arranged that the values of finishing allowance $\delta$ and $\alpha$ are automatically taken into account and added to said set dimension. In addition, the value of $\alpha$ is a suitable fixed value and given to the control unit.

The rough cutting of the outer surfaces and end faces of the workpiece has thus been completed and subsequently, it is followed by finish cutting. In this case, the same cutting tool as the rough cutting tool for the outer surfaces is used for continuous finish cutting of the workpiece, starting at the first end face thereof.

That is, as shown in FIG. 47, the tool is fed at quick speed from the point of termination of the preceding rough cutting of the second outer surface to a point F in a path shown in chain line.

The point F is located at the center of the first end face, or $Z=0$, and the remaining finishing allowance $\delta/2$ plus short of the first end face, that is, $Z=0$ (see FIG. 48).

The machining is effected by moving the tool continuously through the finishing allowance $\delta/2$ of the end face and the finishing allowance $\delta$ of the outer surface, that is, along the profile of the machining dimension.

The machining sequence, as shown in FIG. 49, consists of effecting rough facing from the first stage until the third stage by a tool 1, effecting rough external cutting from the therd stage until the first stage by a tool 2 and effecting finish facing and finish external cutting from the first stage until the third stage by the same tool 2.

While the above description refers to an externally stepped workpiece, the following description refers to an internally stepped workpiece.

A workpiece shown in FIG. 50 has an outer diameter $D_{01}$ and an inner diameter $D_{02}$ and is internally three-stepped. It has a machining allowance as indicated at the shaded portions of these steps and is to be machined to the dimensions shown in FIG. 51.

In the above case, the setting of the machining allowance will be made in the same manner as described above.

Further, it is supposed that separate tools 1 and 2 as shown in FIG. 52 are used for rough facing and rough external cutting.

The setting of the machining dimensions is made in three steps, as shown in FIG. 53. Further, the depth of cut, finishing allowance and machining allowance are set in the same manner as described above.

The machining sequence is as shown in FIGS. 54–59.

As for the positioning of the tools and machining dimensions, the above description applies to this case, provided that "$X=0$" and the "outer diameter of the workpiece" mentioned above shall read "$X=D_{01}$" and the "inner diameter of the workpiece," respectively, and that the sign of $2l$, $2$ and $2\delta$ shall be made opposite in positioning the tools in the $X$ direction.

An example of external cutting and grooving is given in FIG. 60 and in such case it is usual for the setting of digital switches to be made in the manner shown in FIG. 61.

The numerals and characters entered in rectangles in FIG. 61 designate the numerals which have been set in the digital switches, the 1 and 4 in the column of machining shape signify an external cutting fixed cycle and a grooving fixed cycle, respectively. The characters $D_1$–$D_5$ and $L_1$–$L_5$ in the columns of machining dimensions X and Z, respectively, designate diameters and lengths which are put in terms of numerals in mm. Further, $D_0$ in the column of the outer diameter of the workpiece designates the outer diameter of the workpiece which is put in terms of numerals in mm.

Besides the above control information, other control information such as the depth of cut and finishing allowance is necessary in the actual machining, but it is omitted herein.

In the case where grooving is to be performed after completing the external cutting in step form using so much control information, with the embodiments described thus far there would be no choice but to adopt an operation shown in FIG. 62. In FIG. 62, the machining start points A, A', A'' and the machining termination point B are the same point, but in order to facilitate the understanding of the operation of the tool, they are shown diametrically shifted. Further, is control information inevitable to this type of numerically controlled machine tools and it is set usually to about 0.2 mm. The operation shown in FIG. 62 faithfully performs the grooving fixed cycle set in FIG. 61 channel by channel, and the operation itself is not in the least erroneous, but since the information that the outer diameter has already been worked in step form and that the grooving cycles are continuously set, is not contained in the arithmetic function, a large amount of unnecessary movement of the tool is involved. As a result, much time has been involved in grooving.

Figure 66:
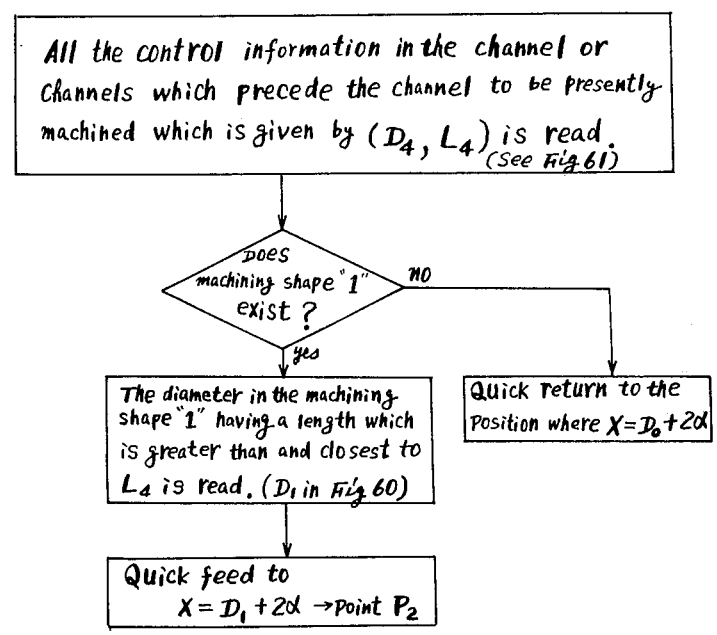

Thus, in this embodiment, three kinds of decision arithmetic functions shown in block diagrams in FIGS. 64–66 are incorporated in the grooving fixed cycle to perform the operation shown in FIG. 63, thereby minimizing the wasteful movement of the tool and greately saving the time required for grooving. The method of grooving in this embodiment will now be sequentially described with reference to the drawings.

First of all, it is supposed that the control information has been as shown in FIG. 61 and that the external cutting as indicated at channel Nos. 1 and 2 has been completed. Now, grooving indicated at channel No. 3 is to be performed. In this channel No. 3 grooving, the start button is pushed, whereby the grooving tool is moved in a controlled manner in accordance with the control information. The manner of control drive is shown in FIG. 63, wherein the tool is quickly fed in the Z direction from the cutting start point A until $Z=L_3$ and it is then quickly fed in the $X$ direction to the position determined as a result of decision calculation being carried out according to FIG. 64, so as to approach the grooving position on the workpiece.

Thus, the decision calculation according to FIG. 64 is such that all the control information in channel Nos. 1 and 2 which precede channel No. 3 according to which cutting is going to be carried out is read and whether the machining shape 1, that is, external cutting exists in said control information or not is decided, and if it exists, what outer diameter the workpiece has at the position $Z=L_3$ is checked and decided (decision calculation) by means of a computor from the preceding data (control information). In the concreate, this decision calculation is such that, as shown in FIG. 64, the diametrical dimension in a preceding channel whose working mode has a length greater than and closest to the machining position $L_3$ which is to be presently machined, among the machining dimensions in the Z direction in the preceding external cutting operation, is read. Thus, in the case of this embodiment, the No. 2 channel is selected as the one which meets the above condition, and the diametrical dimension $D_2$ thereof is read. The cutting tool may be quickly fed in the X direction until $D_2$, but in consideration of the safety of the tool (for example, in order to prevent the tool from striking the workpiece owing to its overrun), the tool is quickly fed until $D_2+2\alpha$. If, however, the setting of external cutting does not exist in the preceding channel or channels, it is impossible to decide what outer diameter the workpiece has at the machining position at which it is to be presently machined. This embodiment copes with such situation by moving the tool at quick cutting feed from a position which is slightly short of the maximum outer diameter of the workpiece, that is, the position $X=D_0+2\alpha$, in consideration of the safety of the tool.

The grooving operation set in channel No. 3 is performed in this manner. The cutting feed in this case continues until the dimension in the X direction in the channel concerned, that is, $D_3$ is reached. In addition, the feed control of the tool is effected by feedback system.

Upon completion of the grooving of No. 3 channel, the grooving tool is quickly returned in the X direction away from the workpiece. The control of the quick return in this case is effected by the decision circuit shown in FIG. 65. Thus, whether the next channel is a grooving cycle or not is decided and in the case where it is a grooving cycle as in this embodiment, further decision calculation shown in FIG. 66 is carried out. If the next channel is not a grooving cycle (including the case where the machining cycle in the next channel is not specified), the decision shown on the right-hand side of FIG. 65 is made and the tool is quickly returned in the X direction until $X=D_0+2\alpha$ and then the Z direction to the machining termination point B.

In the embodiment shown, since the next channel No. 4 is also a grooving cycle, the decision calculation shown in FIG. 66 is made. In this decision calculation, what outer diameter the workpiece has at the machining position which is to be presently machined is decided. By making such decision, unnecessary feeding of the tool is minimized. In the concreate, as shown in FIG. 66, all the control information in the channel Nos. 1, 2 and 3 which precede the next channel is read and whether the external cutting shape 1 exists in said control information or not is decided. If it does not exist, the tool is quickly returned until $X=D_0+2\alpha$ and then quickly fed in the Z direction until the set dimension in the Z direction for the channel under consideration is reached, wherefrom it is driven at cutting feed in the X direction, thereby performing the grooving operation for said specified channel.

However, when the external cutting shape 1 exists as in the embodiment, the dimension in the X direction, that is, the diametrical dimension in the channel, among such channels, whose dimension in the Z direction is greater than and closest to the Z direction set dimension $L_4$ of the channel No. 4 which is to be presently machined is read. In the case of the embodiment, the channel No. 1 is selected as the one which meets the above condition and the diametrical dimension $D_1$ is read. In consideration of this dimension $D_1$ and of the safety of the tool, the tool is quickly returned in the X direction to the position $P_2$ where $X=D_1+2\alpha$. That is, in FIG. 64, the tool is quickly returned in the X direction from the position $D_3$ to the position $D_1+2\alpha$. However, snce said quick return of the tool corresponds to a feed control action for movement to the next machining position, it is as good as quickly feeding the tool if judged on the basis of the next machining.

When the tool is moved to $P_2$ as described above, it is then quickly fed in the Z direction to $L_4$. From this position, it is immediately fed for cutting in the X direction until $D_4$ is reached.

When the grooving for the No. 4 channel is completed in the manner above, the above,the decision calculation described with reference to FIGS. 65 and 66 will be carried out again. In the case of the embodiment shown, the grooving for No. 5 channel will be performed in the manner described above However, in the grooving for the No. 5 channel, no channel has been set which has external cutting shape 1 greater than $L_5$. In such case, the decision calculation shown on the right-hand side of FIG. 66 is made, enabling the grooving for the No. 5 channel to take place smoothly. When the grooving for No. 5 channel is completed, the decision shown on the right-hand of FIG. 65 is made, so that the tool is quickly returned to the machining termination point B shown in FIG. 63.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. In a machine tool apparatus having a machine base, a drive shaft mounted on said base, a chuck operatively mounted on said drive shaft, means for driving said drive shaft, a bed mounted on the top of the base, slide table means operatively associated with the bed for longitudinally sliding movement relative thereto, means to move said slide table means in a longitudinal direction, cross-slide means mounted on said slide table means for transversely sliding movement relative thereto, means to move said cross-slide means in a transverse direction, tool rest means revolvably mounted on said cross-slide means, tool rest clamp lever means for locking said tool rest means to said cross-slide means, longitudinally positioned detector means operatively associated with said slide table means, and a transverse position detector means operatively associated with said cross-slide means, the improvement of a control unit operatively associated with said machine tool apparatus for operating same automatically, said control unit comprising electric circuit means corresponding to a mastern pattern for forming working mode patterns for a cutting tool in the longitudinal direction and the transverse direction respectively, means forming each working mode pattern of a cutting tool carried by the tool rest means into a fixed movement cycle, digital switch means for selecting and pre-setting each working mode pattern of the cutting tool, means actuated by each of said digital switch means for driving the slide table means and the cross-slide means in accordance with the master pattern to permit the cutting tool to achieve the desired machining.

2. A machine tool apparatus in accordance with claim 1, wherein said digital switch means include a digital switch for setting the rough and finish cutting dimensions of the cutting tool, a digital switch for setting the shaft rotation speed of the main drive shaft, a digital switch for setting the feed speed of a cutting in the longitudinal and transverse directions respectively, a digital switch for setting the machining dimensions in the longitudinal and the transverse directions respectively, and a digital switch for setting all information common to all working mode patterns as to the dimensions of a workpiece, the depth of cut, the finishing allowance, and the machining allowance.

3. In a machine tool apparatus in accordance with claim 1, wherein said control unit further includes register means for detecting and memorizing the present position of a tool attached to the tool rest in the longitudinal direction and the transverse direction, means for correcting the memorized value in the longitudinal direction position memorizing register means corresponding to the tool attached to the tool rest by the measured dimension of a portion of the workpiece cut on trial by said tool, means for zeroing the memorized value in the transverse direction position memorizing register corresponding to the tool by bringing the tool on the tool rest against a given position on the workpiece serving as a reference position, a digital switch means for setting the position correction value of the tool in order to put said correction value into the longitudinal and transverse direction memory registers, digital switch means for putting the outer and inner diameters of the workpiece, the depth of cut and the machine allowance thereof into a drive control section for the tool, the machining shape, the tool to be used, the main drive shaft rpm and the tool feed speed for each mode and putting same into said electrical circuit means, the arrangement being such that the tool is repeatedly moved in the longitudinal and transverse directions in an L-shaped path until the workpiece attains the finish size.

4. A machine tool apparatus in accordance with claim 1, wherein said control unit further includes register means for detecting and memorizing the present positions of a plurality of tools attached to the tool rest in the longitudinal and transverse directions respectively, means for correcting successively and individually the memorized values in the longitudinal direction position memorizing registers corresponding to the plurality of tools attached to the tool rest by the measured dimensions of portions of the workpiece cut on trial by said tools, means for successively and individually zeroing the memorized values in the transverse direction position memorizing registers by successively bringing the plurality of tools on the tool rest against given positions on the workpiece serving as reference positions, means for calibrating in unison the plurality of longitudinal and transverse direction position memorizing registers, digital switch means for setting the position correction values of the tools in order to put them into the longitudinal and transverse direction memory registers, digital switch means for putting the outer and inner diameters of the workpiece, the depth of cut and finishing allowance into drive control means for the tools, and a plurality of digital switch means for setting the machining shape, the tool to be used, the main shaft rpm and the tool feed speed for each working mode pattern, whereby each tool will be repeatedly moved in the longitudinal and transverse directions in an L-shaped path until the workpiece attains the finish size.

5. A machine tool apparatus in accordance with claim 1, wherein said apparatus further includes detectors operatively associated with said control unit for detecting the amount of movement of the tool rest, means for memorizing and indicating the detected values, means for resetting the memorized values and indicated values, and a manual feed handle attached to the tool rest slide for bringing the tool mounted on the tool rest against the workpiece carried by the chuck for cutting the workpiece on a trial basis, the finish dimension of the cut portion of the workpiece being then measured with the tool held in that condition, the measured value being taken as the correct position in the transverse direction and utilized to correct the memorized value and indicated value by said correcting means, said tool being brought against the reference position for the longitudinal direction machining dimension of the workpiece to enable said resetting means to bring the longitudinal direction memorized value and indicated value to zero.

* * * * *